US006965912B2

(12) United States Patent
Friedman et al.

(10) Patent No.: US 6,965,912 B2
(45) Date of Patent: Nov. 15, 2005

(54) METHOD AND APPARATUS FOR DISTRIBUTION OF GREETING CARDS WITH ELECTRONIC COMMERCE TRANSACTION

(75) Inventors: Doron Friedman, Goleta, CA (US); Ajay Singhvi, New York, NY (US); Brian J. Huse, Santa Barbara, CA (US)

(73) Assignee: 4YourSoul.com, Santa Barbara, CA (US)

( * ) Notice: Subject to any disclaimer, the term of this patent is extended or adjusted under 35 U.S.C. 154(b) by 0 days.

(21) Appl. No.: 09/420,434

(22) Filed: Oct. 18, 1999

(65) Prior Publication Data

US 2003/0208556 A1 Nov. 6, 2003

(51) Int. Cl.[7] ............................................. G06F 15/16
(52) U.S. Cl. ..................... 709/203; 709/206; 709/217; 709/246
(58) Field of Search ............................... 709/203, 206, 709/217, 246, 232

(56) References Cited

U.S. PATENT DOCUMENTS

| | | | | |
|---|---|---|---|---|
| 5,072,253 A | * | 12/1991 | Patton | 355/40 |
| 5,426,594 A | * | 6/1995 | Wright et al. | 709/206 |
| 5,437,478 A | | 8/1995 | Gaines | |
| 5,466,919 A | | 11/1995 | Hovakimian | |
| 5,513,117 A | | 4/1996 | Small | |
| 5,552,994 A | | 9/1996 | Cannon et al. | |
| 5,555,496 A | * | 9/1996 | Tackbary et al. | 705/27 |
| 5,600,563 A | | 2/1997 | Cannon et al. | |
| 5,748,484 A | | 5/1998 | Cannon et al. | |
| 5,751,590 A | | 5/1998 | Cannon et al. | |
| 5,870,718 A | * | 2/1999 | Spector | 705/26 |
| 5,960,412 A | | 9/1999 | Tackbary | |
| 6,038,573 A | * | 3/2000 | Parks | 707/513 |
| 6,052,514 A | * | 4/2000 | Gill et al. | 345/733 |
| 6,092,054 A | | 7/2000 | Tackbary | |
| 6,295,058 B1 | * | 9/2001 | Hsu et al. | 345/724 |
| 6,453,300 B2 | | 9/2002 | Simpson | |

FOREIGN PATENT DOCUMENTS

| | | |
|---|---|---|
| EP | 0784394 A1 | 7/1997 |
| WO | WO 9933010 | 7/1999 |
| WO | WO 0063820 | 11/2000 |

OTHER PUBLICATIONS

Wysiwyg Window–Sizing Management, IBM Technical Disclosure Bulletin, ppg. 627–630, Vo. 37, No. 04A, Apr. 1994.

* cited by examiner

*Primary Examiner*—Frantz B. Jean
(74) *Attorney, Agent, or Firm*—Kudirka & Jobse, LLP

(57) ABSTRACT

A system for enabling on-line creation of greeting cards and distribution of the cards with gifts also purchased on-line includes a server system and one or more client systems. The server system is accessible online and enables network users to select and customize electronic versions of greeting cards. The customizations to the cards, as well as data identifying the card, the network user, the card recipient, and a vendor, are transmitted to a client system located at the vendor's distribution facilities. The transmitted information is utilized to print the card in hard copy form for shipment by the vendor to the designated recipient. In the disclosed system, a network user may view the card including any customizations in WYSIWYG format.

31 Claims, 27 Drawing Sheets

| Field | ID |
|---|---|
| INVOICE NUMBER | 902 |
| USER EMAIL | 904 |
| CREDIT CARD NAME | 906 |
| CREDIT CARD NUMBER | 908 |
| CREDIT CARD EXP. YEAR | 910 |
| CREDIT CARD EXP. MONTH | 912 |
| CREDIT CARD TYPE | 914 |
| CREDIT CARD STREET1 | 916 |
| CREDIT CARD STREET2 | 918 |
| CREDIT CARD CITY | 920 |
| CREDIT CARD STATE | 922 |
| CREDIT CARD ZIP | 924 |
| CLIENT IDENTIFICATION # | 926 |
| GIFT LIST | 930 |
| INV. LINE ITEM NUMBER | 930A |
| SKU | 930B |
| GIFT DESCRIPTION | 930C |
| DISTRIBUTION LOCATION # | 930D |
| DATE OF SHIPMENT | 930E |
| SHIP TO PERSON | 930F |
| SHIP TO CITY | 930G |
| SHIP TO STATE | 930H |
| ⋮ | |
| GIFT LIST | 932 |
| INV. LINE ITEM NUMBER | 932A |
| SKU | 932B |
| GIFT DESCRIPTION | 932C |
| DISTRIBUTION LOCATION # | 932D |
| DATE OF SHIPMENT | 932E |
| SHIP TO PERSON | 932F |
| SHIP TO CITY | 932G |
| SHIP TO STATE | 932H |

*Figure 9*

METHOD AND APPARATUS FOR DISTRIBUTION OF GREETING CARDS WITH ELECTRONIC COMMERCE TRANSACTION

FIELD OF THE INVENTION

This invention relates to an electronic commerce, in general, and, more specifically, a system for selecting, customizing and coordinating delivery of greeting cards with gifts purchased over computer networks.

BACKGROUND OF THE INVENTION

The World Wide Web and Internet, in general, have created a completely new venue in which to obtain information, purchase goods and services, and interact with other network users. Accordingly, many sources of products and services have established web sites containing information about products, services and available information. A number of commercially available software applications, e.g. web browsers, executable on a conventional computer architecture enable users to connect to the Internet and provide a graphic user interface and appropriate functionality for locating and exploring "websites". Examples of such commercially available browsers include Netscape Navigator, commercially available from America On Line, Inc., or Internet Explorer, commercially available from Microsoft Corporation, Redmond, Wash. Websites typically comprise a server operatively coupled to the Internet, the server having one or more "pages" which may be explored by a user using the web browser application.

Using a web browser, computer shoppers have the ability to access and purchase products and services from far reaching locations, including international locations. In order to purchase a product, the shopper accesses the web site server of a vendor, selects a product, provides payment, typically in the form of credit card information, and provides delivery instructions to the vendor.

The purchase of goods and services over the Internet, referred to hereafter as, "eCommerce", has become very popular recently. In many instances, eCommerce vendors try to emulate normal retail commerce with varying degrees of success. For example, gift-buying via eCommerce has failed to emulate normal retail commerce as a result of its inherent lack of personalization. In the real world, when giving a gift, a person typically purchases a product as a gift. In addition, the person may purchase a card to help express his or her thoughts about the gift or the occasion. Such cards usually contain personal, handwritten messages and are packaged along with the gift for simultaneous presentation to the recipient.

It is possible to purchase products or services as gifts from the websites of eCommerce vendors and have them sent to a recipient's address. It is also possible to purchase electronic cards over the Internet to be delivered either to the recipient's e-mail address or printed in hard copy form and delivered to the recipient's postal address. However, no known service or facility exists which enables an eCommerce shopper to purchase a gift over the Internet and concurrently select and personalize a greeting card to be packaged or shipped along with the gift. Some companies do provide a limited selection hard copy cards that maybe shipped with a gift, similar to the note cards which accompany floral deliveries.

In addition, current on-line electronic greeting card services, such as those offered by Hallmark, Inc., City, State, or American Greetings Corporation, Cleveland, Ohio, enable users to select a card and customize the card by entering text into a dialog box via the webserver graphic user interface. Such services do not enable the user to add handwritten notes, graphics, photographs, or other customizations to the card. These services do not allow the user to decide where the text should go, what font, color, size, etc. should be used for the text.

Further, many greeting cards are sent for specific occasions, birthdays, anniversaries, etc. Accordingly, the purchase and sending of the card is time sensitive in order for the card to have the most effect. If the recipient of the card is in another country, cost and lead time to send the card may increase substantially.

Accordingly, a need exists for a system which enables an eCommerce shopper to select, customize and transmit greeting cards contemporaneously with the selection of a gift from an eCommerce vendor, and to enable simultaneous shipment of the customized greeting card with the gift.

A further need exists for a system by which eCommerce shoppers may select a card and customize the card meaningfully by selecting the style, size, color and type of font to sign the card and are restricted only by the space on the card and not by a random word count designated by the card vendor.

A further need exists for a system and method in which eCommerce shoppers may create a card meaningfully by adding graphic data, including possibly handwritten notes, photographs and scanned data to the card.

A further need exists for a system and method in which the card and the user's customizations to the card may be viewed by the purchaser in a What You See Is What You Get (WYSIWYG) format while on-line.

A further need exists for a system and method in which greeting cards customized over the Internet may be viewed in a WYSIWYG format and either printed and mailed from a central distribution center or transmitted over a computer network to the distribution center of an eCommerce vendor for printing and shipment with a gift.

A further need exists for a system and method in which customized greeting cards could be shipped across the Internet and printed in other countries or in other regions of the same country thereby decreasing delivery time and reducing postage and handling costs.

SUMMARY OF THE INVENTION

The present invention discloses a method, system and apparatus for enabling on-line selection, customization and transmission of greeting cards over a computer network. In one embodiment of the invention, an eCommerce shopper/network user connects to the inventive system. The network user may select from any of a number of card templates stored in a database. The cards are presented to the network user in a WYSIWYG format. The user is able to customize the card by adding text, handwritten notes, graphics, photographs and scanned data to the card and view the customized card in a WYSIWYG format. After purchase, the customized card is printed by the inventive system and mailed to the address of a recipient, as specified by the network user.

In a second implementation of the invention, following purchase of the card, the card is transmitted to the distribution center of an eCommerce vendor from whom a gift has been purchased. There the card is printed, matched and shipped along with the gift to the recipient, as specified by the network user. In this implementation, a network user connects with the website of an eCommerce vendor. After selecting a gift from the eCommerce vendor, the network user is able to optionally connect to the inventive system for selection of a greeting card. The network user is able to select and customize a card, as described previously in the first implementation. After purchasing the card, the data and data structures representing the customized card, as well as data defining the purchaser, recipient(s), and identifying the gift or transaction to the eCommerce vendor product are transmitted over a computer network to the distribution center of the eCommerce vendor. The customized card is printed at the eCommerce vendor's distribution center, preferably on a high resolution graphics printer, matched with the gift and shipped with the gift to the recipient. In this manner, the recipient simultaneously receives a gift and card, both of which have been purchased over the Internet, as if the sender had purchased the gift and card at traditional retail establishments.

In addition, in the contemplated system, the purchaser/sender of a card is offered the opportunity to direct a portion of the proceeds from the card sale to one or more user-selectable charities, at the time the card is purchased.

The inventive system may be implemented over a public global computer network utilizing a master server system and one or more client systems located remotely from the master server but capable of operatively coupling thereto. The master server system may comprise one or more separate computer systems which collectively enable network users currently shopping at an eCommerce vendor's website to be redirected to a web server within the master server system to select and customize a card. Information identifying the network user, the eCommerce vendor, the eCommerce transaction, the selected card and any customizations or modifications thereto are stored in a database within the master server system and selectively transmitted over a computer network to one of the client systems located at the eCommerce vendor's facilities, typically a distribution center. The transmitted data is utilized by the client system to retrieve the card and print the card in conjunction with the network user defined customizations at the vendor's facilities. The printed card may be then matched by the vendor with a gift or corresponding transaction and shipped to a recipient designated by the network user. In the inventive system, a database of cards may be located at both the master server system as well as any of the client systems.

The inventive system enables the network user to view customizations to the selected card in WYSIWYG format and further allows network users to connect directly to the master system for creation and purchase of cards separate and apart from any vendor transaction.

According to one embodiment of the present invention a method in a computer system connectable to a computer network, comprising the steps of: (a) maintaining a network accessible compilation of cards; (b) receiving data identifying one of the cards; (c) receiving data defining modifications to the cards; (d) presenting an image of the card in combination with the received modifications in What You See Is What You Get (WYSIWYG) format; and (e) receiving data identifying a destination address of the card. In alternative implementations of this method the destination address may comprise a postal address or a computer network address. In other alternative implementations of this method the data defining modifications to the card comprises a graphical image data and may further comprise any of scanned data, photographic images, scanned handwritten data or objects, font type data, font style data, font size data or font color data. In yet other alternative implementation of this method, the method may further comprise the step of transmitting data representing modifications to the card to a peripheral apparatus for rendering thereof.

According to a second embodiment of the present invention a computer program product for use with a computer system operatively coupled to a computer network comprises a computer usable medium having program code embodied thereon, the program code comprising: (a) program code for maintaining a network accessible compilation of cards; (b) program code for receiving data identifying one of the cards; (c) program code for receiving data defining modifications to the cards; (d) program code for presenting an image of the card in combination with the received modifications in WYSIWYG format; and (e) program code for receiving data identifying a destination address of the card.

According to a third embodiment of the present invention a data structure representing a card in a computer usable memory comprises: (a) data identifying one of a plurality of card templates; (b) data identifying modifications to the identified card template; and (c) data defining an address to which the card will be sent; and (d) data associating the card with another transaction. In alternative implementations of this data structure in memory the data associating the card with another transaction may comprise any of data defining a vendor identifier, vendor transaction identifier, vendor package identifier or vendor network address. In another alternative implementation of the inventive data structure in memory the data defining modifications to the card template comprises graphical information and data defining the relationship of the graphical information to the card template.

According to a fourth embodiment of the present invention a method for sending greeting cards over a computer network comprising the steps of: (a) selecting a card from one of a plurality of card templates; (b) modifying the card; (c) viewing the modifications to the card in WYSIWYG format; (d) designating a destination address; (e) transmitting any of the card identifier, data modifying the card and destination address to a remote location over a computer network; (f) authorizing printing of the card in combination with the modifications; and (g) authorizing delivery of the card to the destination address in conjunction with delivery of a gift with which the card is associated.

According to a fifth embodiment of the present invention a computer system connectable to a computer network comprises (a) a processor; (b) a memory coupled to the processor for storing a plurality of cards; (c) a network interface coupled to the processor in a memory; (d) program logic configured to receive data identifying one of the plurality of cards and further defining modifications to the card; (e) program logic configured to present an image of the card in combination with the received modifications to the card; (f) program logic configured to receive data identifying a destination address of the card; (g) program logic configured to receive data identifying a vendor transaction associated with the card; and (h) program logic configured to transmit any of the card identifier, data modifying the card, destination address and vendor transaction identifier to a remote location over a computer network. In alternative implementations of this computer system the data associating the card with another transaction may comprise any of data defining a vendor identifier, vendor transaction identifier, vendor package identifier or vendor network address.

BRIEF DESCRIPTION OF THE DRAWINGS

The above and other features, objects and advantages of the invention will be better understood by referring to the following detailed description in conjunction with the accompanying drawing in which:

FIG. 9 is a conceptual illustration of the data structures used to represent a card in accordance with the present invention;

DETAILED DESCRIPTION

Figure 1:
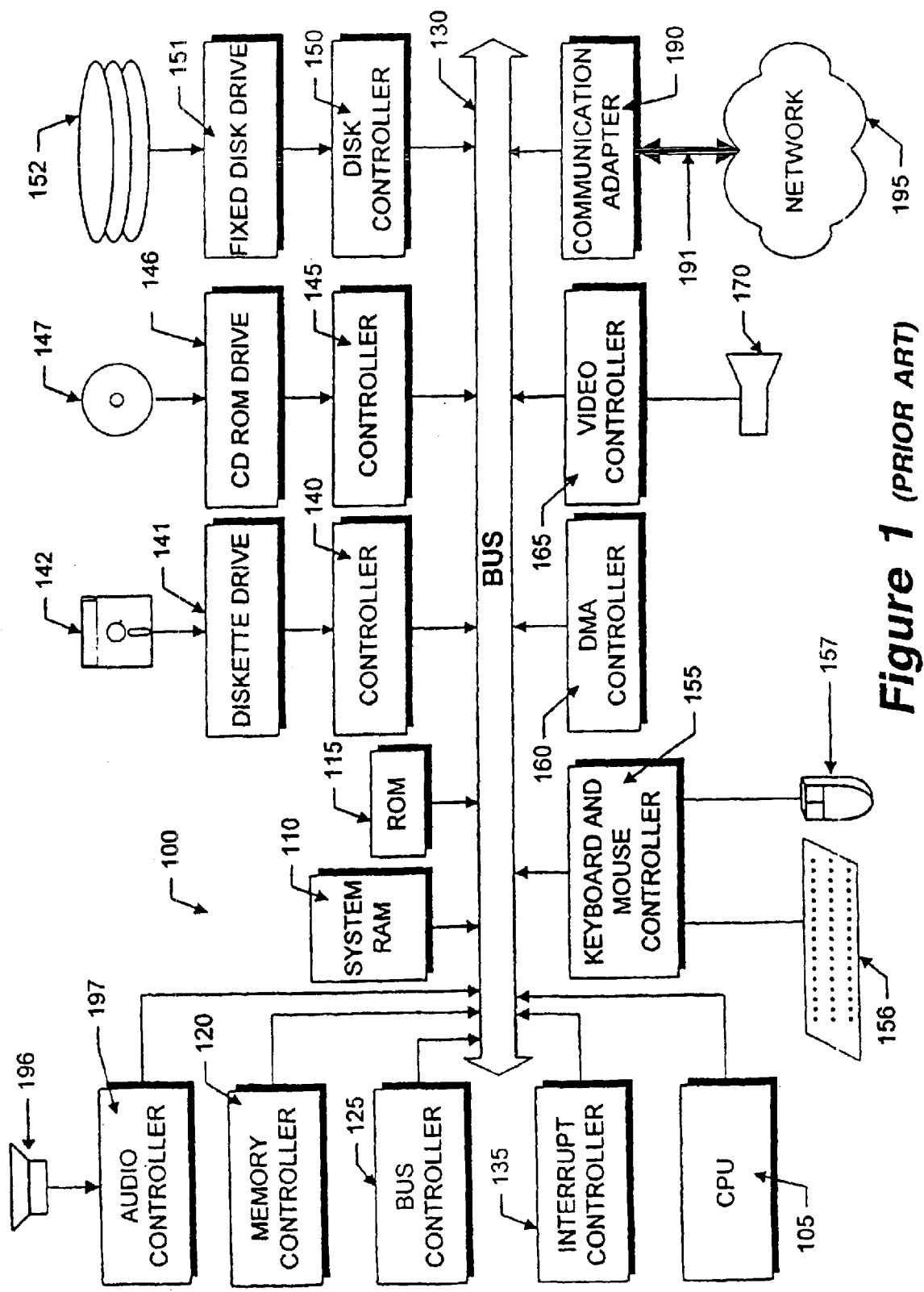
FIG. 1 is a block diagram of a computer system suitable for use with present invention.

FIG. 1 illustrates the system architecture for a computer system 100 such as a Sun SparcStation 5 workstation, commercially available from Sun Microsystems of Palo Alto, Calif., or an IBM RS/6000 workstation, or IBM Aptiva PC, both commercially available from International Business Machines Corp. of Armonk, N.Y., on which the invention may be implemented. The exemplary computer system of FIG. 1 is for descriptive purposes only. Although the description may refer to terms commonly used in describing particular computer systems, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as Windows 95 or Windows NT®, commercially available from Microsoft Corp., Redmond, Wash. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2®, UNIX®, Linux and Solaris®, among others.

One or more applications such as a web browser, for example, Netscape Navigator, version 2.0 and thereafter commercially available from Netscape Communications Corporation. and Internet Explorer, version 1.0 and thereafter, commercially available from Microsoft Corporation, Redmond, Wash., may execute under the control of the operating system.

Communication Environment

Figure 2:
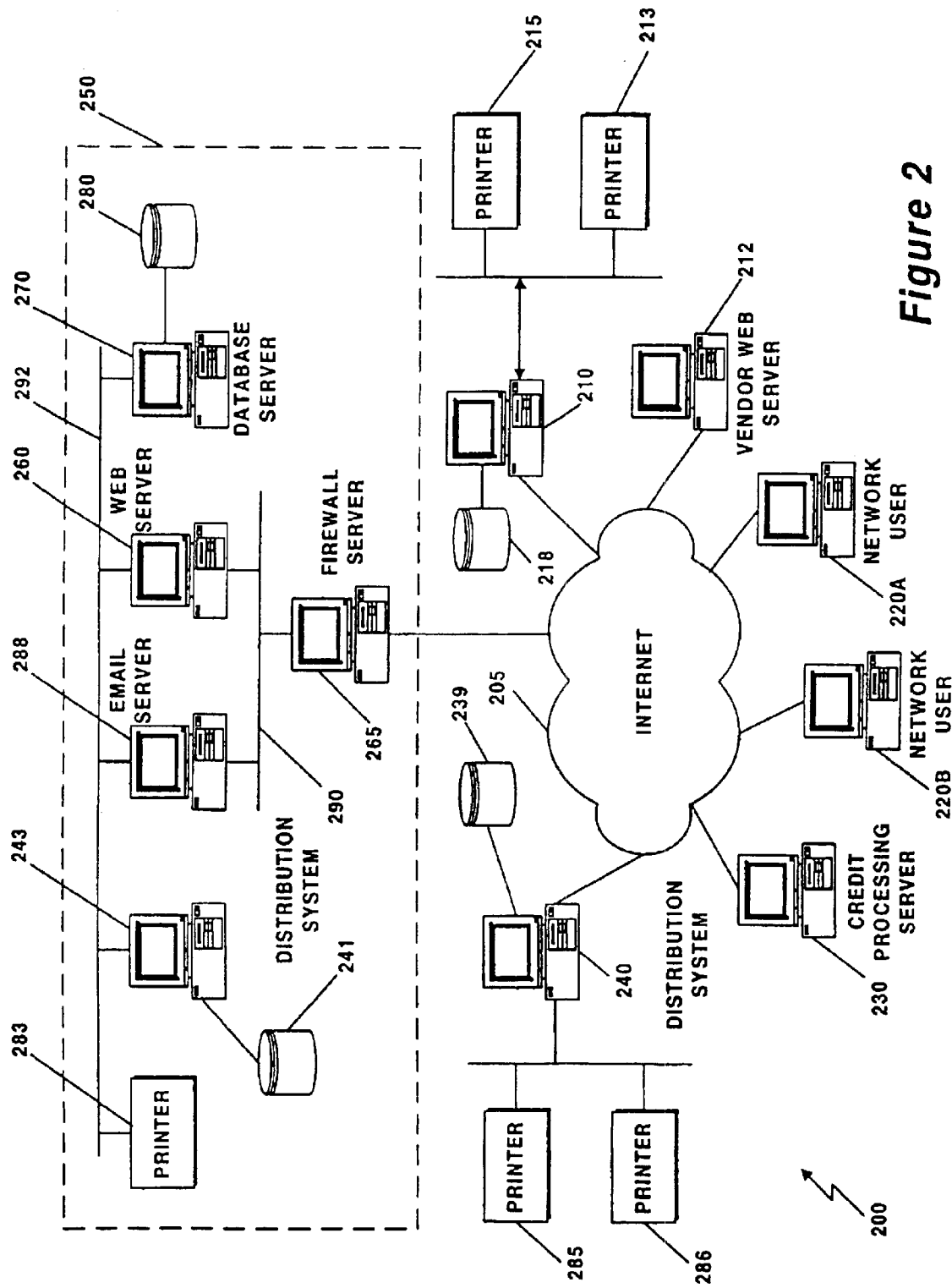
FIG. 2 is a conceptual block diagram of the elements of the inventive system in a network environment.

FIG. 2 illustrates a telecommunications environment in which the invention may be practiced, such environment being for exemplary purposes only and not to be considered limiting. Network 200 of FIG. 2 illustrates a hybrid telecommunication environment including packet-switched data networks, such as the Internet and private Intranets, as well as apparatus bridging between the two. Not every element illustrated in FIG. 2 or described herein is necessary for the implementation or the operation of the invention.

As illustrated in FIG. 2, a global packet-switched network topology, illustrated as the Internet 205, interconnects various other computers in the network environment to the inventive system 250 of the present invention over a network. As will be understood by those skilled in the art, the Internet is essentially a network of networks which collectively form a global wide area network enabling processes at different network addresses, and typically in geographically disparate locations, to establish communication connections and to transmit data in a variety of formats. In the illustrative embodiment, any number of different transport protocols may be utilized between and among the various processes connectable across the Internet and private Intranets, e.g. Local Area Networks.

As illustrated in FIG. 2, in addition to system 250, a plurality of other computer systems 210, 212, 220A–B, 230, 240, 250, 260, 265, and 270 are coupled, directly or indirectly, to the Internet 205. Each of these computer systems may be implemented with a computer architecture similar or equivalent to that described with reference to FIG. 1 and capable of executing a computer operating system, such as Windows NT 4.0, available from Microsoft Corporation, Redmond, Wash. Such an operating system is a multi-tasking operating system capable of executing multiple simultaneous threads of execution. Other commercially available operating systems such as Unix, Linux, OS/2, and Solaris may also be utilized. Computer systems 210–270 may utilize any of a number of technologies known in the arts to connect to Internet 205. For example, computer system 220A, which represents a network user, may be connected to the Internet through a dial-up connection to an Internet Service Provider, not shown, such as America On-line or Compuserve. Computer system 220B, representing another network user, may alternatively be coupled to the Internet through a cable modem and broadband cable network infrastructure, also not shown. Vendor distribution computer system 210 and vendor web server system 212, may be connected to the Internet utilizing frame relay technology and a high bandwidth connection, such as T1, T2 or T3 line. Computer system 230, representing a credit processing server, and computer system 240, representing a card vendor distribution center computer(s), may be similarly connected to Internet 205 using any of the previously-described techniques or any other techniques known in the arts.

Card Vendor System

Referring to FIG. 2, a conceptual block diagram of the card vendor system 250 in accordance with the present invention is illustrated. The system 250 comprises a web server 260, a database server 270 and database 280, and email server 288 operatively coupled, in the illustrative embodiment, via a private network 292, e.g., a packet-switched network, such as a Local Area Network executing the TCP/IP protocol. Network 292 is a private network which may further be used to connect to printer 283 to the distribution computer system 243 and database 241. In the illustrative embodiment network 292 may comprise a 100 megabit Ethernet network. A private network 290 couples both web server 260 and email server 288 to firewall server 265. Firewall server 265 is, in turn, connected to Internet 205, via a T1 line, or other connection such as a frame relay connection In the illustrative embodiment of the present invention, email server 288 may be implemented as a server executing an application program in accordance with the Post Office Protocol version 3.0 (POP3), such server capable of receiving and sending electronic mail in a manner understood by those skilled in the arts.

In a similar manner, firewall application 265 may be implemented as a server or network appliance executing any of a number of commercially available network security applications which prevent unauthorized access to private networks in a manner understood by those skilled in the arts.

In the illustrative embodiment, web server 260 performs the functions of a traditional web server enabling access to one or more web pages by other processes connected to Internet 205. In addition, webserver 260 contains display control module 266 which utilizes data representing a card, as retrieved from database 280, and data representing modifications to the selected card, as received from a network user, to render the selected card and its modifications in a WYSIWYG format for viewing by the network user.

Server 260 may be implemented using a hardware platform similar to that illustrated with reference to FIG. 1. Executing under the control of an operating system are one or more applications necessary for web server 260 to perform its appropriate functions. Specifically, web server 260 presents web pages to the network user and controls the flow of information to/from database server 270. In the illustrative embodiment, the functions performed by web server 260 may be implemented either with object-oriented programming techniques using the appropriate class definitions and objects for values within the database, or, alternatively, using a non-object oriented language such as the C++ programming language.

Web server 260 retains in memory one or more "pages" which collectively may comprise a web site used to visually present the information on the pages. One or more of the pages accessible on web server 260 may contain address information in the form of a Hypertext Markup Language (HTML) tag which may be downloaded over the Internet 205 to a browser process executing on any of the other computer systems connected to the network. Such HTML tag may include the IP address or E-mail address associated with the web site.

Web server 260 functions to render pages to a network user connected to the web server 260 and to pass data received from a network user to database through the appropriate Application Program Interfaces (APIs). In the illustrative embodiment, the web server 260 may utilize a plurality of Visual Basic, Java script files and/or Java applets to create active web pages. Web server 260 may include a database interface (not shown) which functions as the interface between web server 260 and database server 270. Such database interface may be implemented via ODBC, Remote Procedure Call libraries or other similar technologies which enables the interface to make remotely access the database server 270 and to service calls received from database server 270.

The distribution computer system 240 and its accompanying database 239 may be connected to system 250 via direct network connection or other connections such dialup modem, DSL or frame relay. Computer system 240 may be coupled to one or more network printers 285 and 286 via a private network such as a LAN.

Figure 3:
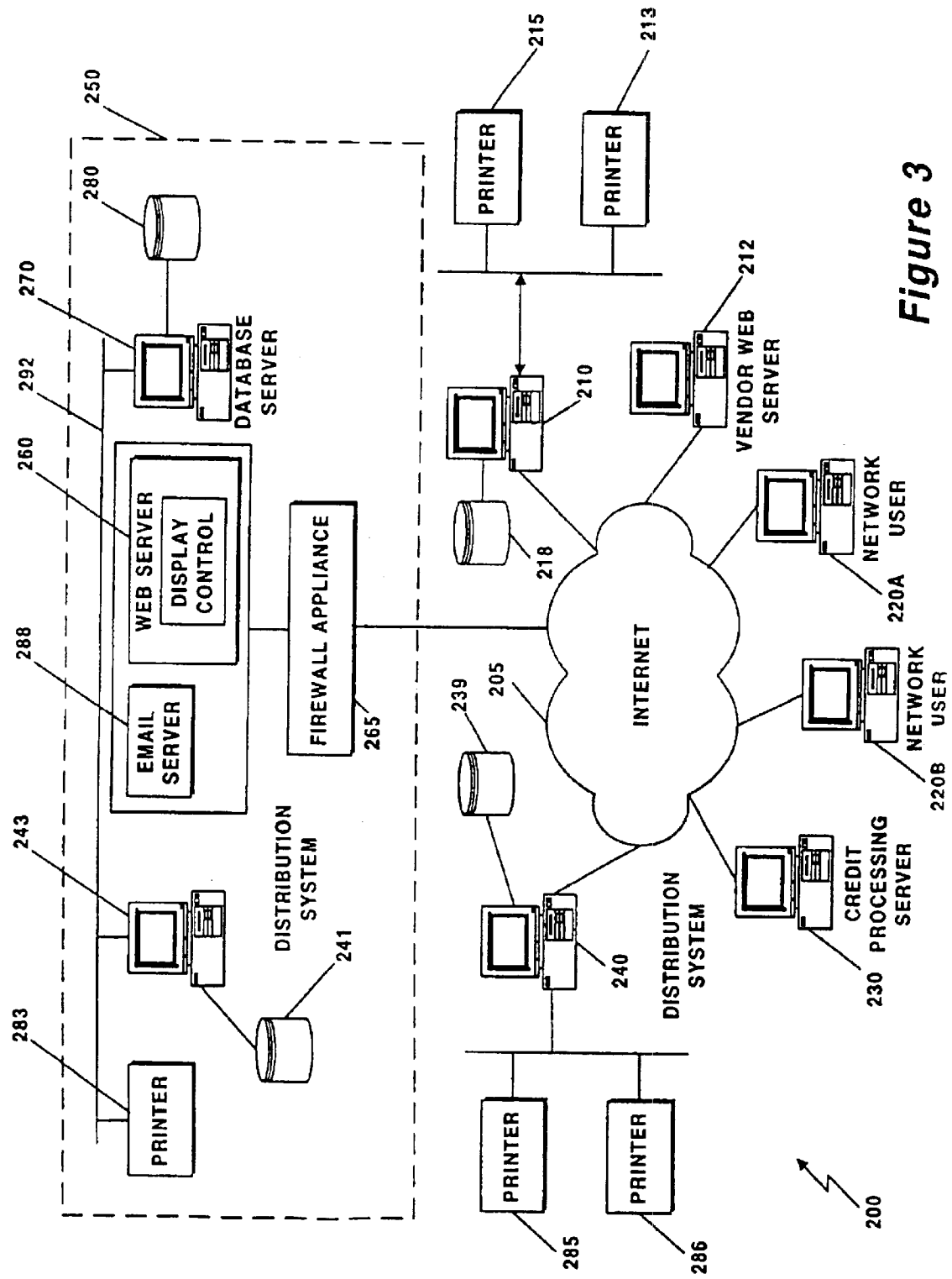
FIG. 3 is a conceptual block diagram of the elements of an alternative implementation of the inventive system in a network environment.

In an alternative embodiment to that illustrated in FIG. 2, email server 288 and web server 260 may be implemented with applications which execute on the same computer system, as illustrated in FIG. 3.

Data Base Architecture

In the illustrative embodiment, database server 270 and database 280 may comprise a hardware platform and an operating system capable of executing one of a number of commercially available database products. In the illustrative embodiment, hardware platform may be implemented with a computer system similar to that described with reference to FIG. 1. The operating system may be implemented with the Windows NT 4.0 product from Microsoft. The database product may be implemented with Microsoft SQL Server Version 7.0, also commercially available from Microsoft Corporation. The structure of information, including the data fields, records, tables which comprise database 280 are described hereinafter and may also be designed using Microsoft SQL Server Version 7.0.

Query engine (not shown) receives information from web server 260 in the form of a query and supplies the query to database 280. The structure and organization of records within database 280 is set forth in greater detail with reference to FIGS. 4–5. Database server 270 and database 280 communicate using SQL standard database query language. The SQL standard is published by the American National Standards Institute (ANSI). The database query engine which is integrated into database server filters the queries received from web server 260, such filters useful in focusing or customizing the scope of a database query. The information retrieved from database 280 may be forwarded by database server 270 to web server 260 using any number of know techniques such as remote procedural call libraries, as that previously described.

Figure 4A:
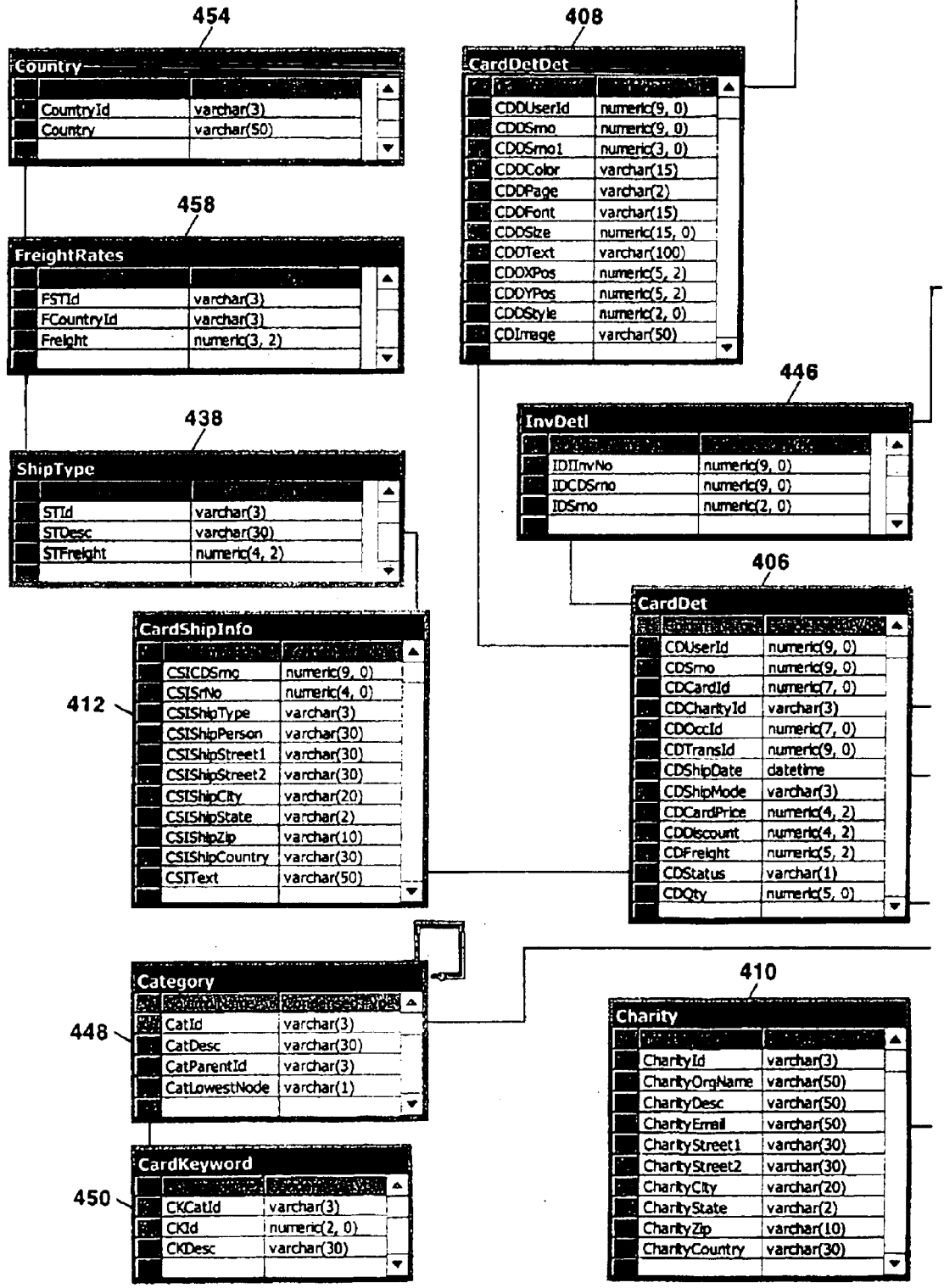
FIGS. 4–5 illustrate conceptually the construction of the inventive database and the information contained therein.
Figure 4B:
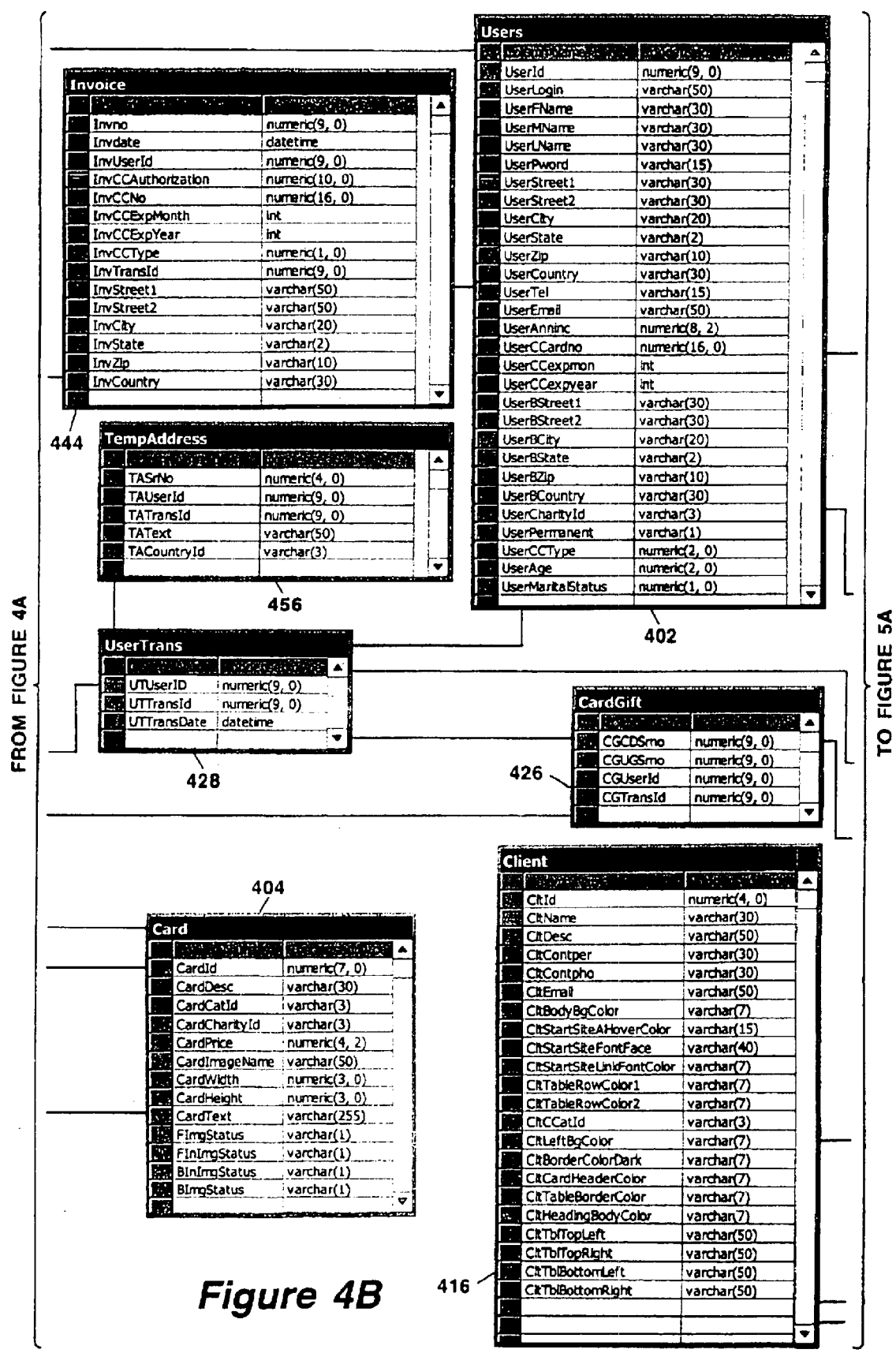
Figure 5A:
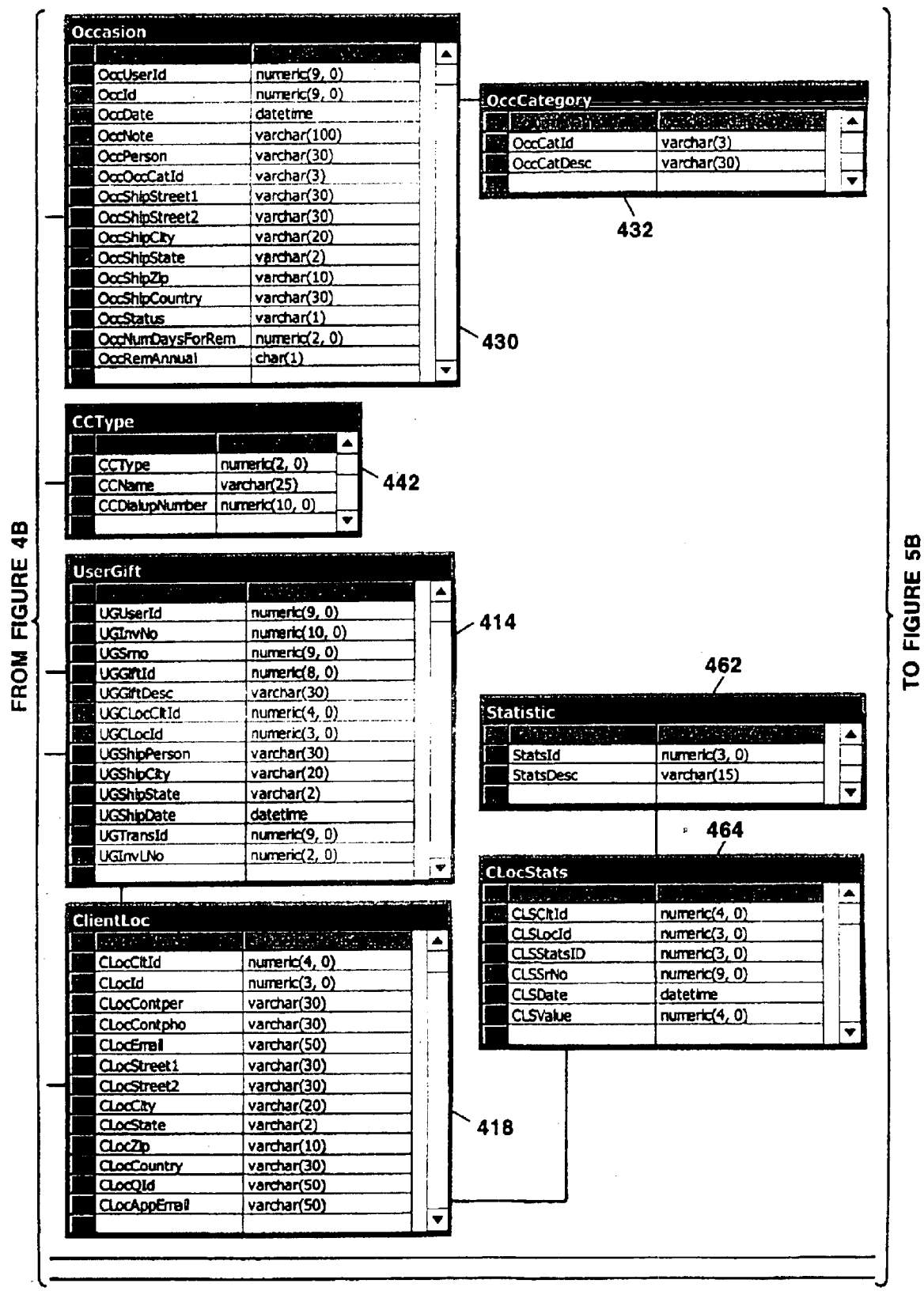
Figure 5B:
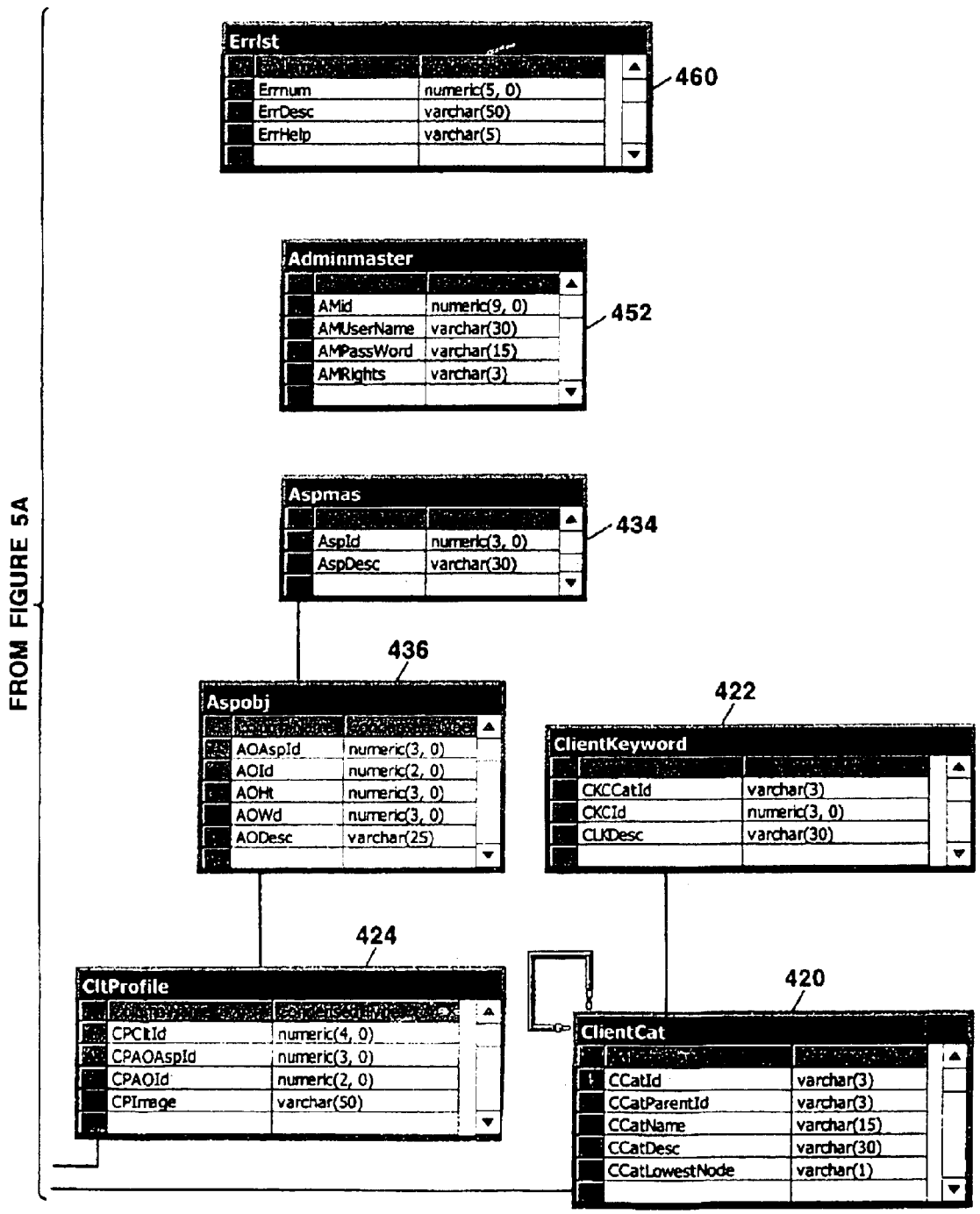

FIGS. 4–5 illustrate conceptually the tables which comprise database 280. Each record, as shown, includes one or more fields and an associated field descriptor, as illustrated. Multiple records of the same type, in turn, collectively form a table within database 280. A field within a record may serve as an index into another record. To further a better understanding of the architecture of database 280, the major tables, as illustrated conceptually by single record and its corresponding fields, are described below in greater detail.

User Table 402 is used to maintain information about a network user who has visited system 250 via a connection to webserver 260. Each record of User Table 402 includes fields for a user identifier, postal address, network address, age, marital status, telephone number, etc. The corresponding field descriptions, e.g. integer, variable character, number, etc., are illustrated in FIG. 4.

Card Table 404 is used to maintain information about a specific card of the master card list. Each record of Card Table 404 includes fields for a card identifier, price, card catalog identifier, text description, width and height of the card, a charity identifier, etc. The corresponding field descriptions are illustrated in FIG. 4A. In the illustrative embodiment, the actual cards may be stored in any graphical format, for example, jpg, gif, tif or bmp. The cards may be stored as part of or separate from database 280, as well as in the database 242 of distribution system 240 and database 218 of distribution system 210, both connectable to system 250. In the illustrative embodiment, the term "card" or "greeting card" is not limited to traditional hard copy cards but also includes images of one or more sides or panels of a card as may be stored in various graphical data formats and resolutions, in addition to those described herein. Further, the term "card" or "greeting card" is not limited to traditional hard copy cards but also includes other related forms of correspondence including announcements, invitations, business cards, notices, and other business and personal forms of communication.

Card Detail Table 406 (CardDet) is used to maintain information about a specific card which has been ordered by a network user. Each record of Card Detail Table 406 includes fields for the ship date, ship month, status, etc. The corresponding field descriptions are illustrated in FIG. 4.

The Card Detail Detail Table 408 (CardDetDet) is used to maintain information about changes or customizations made to the card by the network user. Each record of the Card Detail Detail Table 408 includes fields defining fields the font, size, color, text, X-position, Y-position, style, file name for an attached file containing graphics, digital photos, scanned data, etc. The corresponding field descriptions are illustrated in FIG. 4.

Charity Table 410 is used to maintain information relating to a specific charity from which proceeds of the card sale may be donated, as explained in greater detail hereinafter. Each record of Charity Table 410 includes fields for a charity identifier, charity description, organizational name, mailing address, etc. The corresponding field descriptions are illustrated in FIG. 5.

The remaining tables of FIGS. 4–5 include records having the information fields and field descriptors, as illustrated and which are self-explanatory. For example, the Card Ship info record 412 includes information relevant to the address to which the card is to be shipped. The user gift record 414 includes information about a gift with which the card is associated. The client table 416, client location record 418, client category 420, client key word record 422, and client profile record 422 all maintain information about a client (vendor) from which a gift was purchased and to which the card may be shipped for coordination with the shipment of the gift to the specified recipient. The card gift record 426 and user transmit record 428 include information useful in coordinating the shipment and printing of a card with a specified gift purchased at or shipped from a client's facilities. The occasion record 420 and occasion category record 432 include information fields describing a particular person, date and address for which a card was or may be ordered, and the nature of the occasion, e.g., birthday, anniversary, graduation, etc., respectively. Such information is useful for administrative and tracking purposes as well as for implementation of a reminder service. The ASPOBJ table 436 and ASPMAS table 434 include information fields used to enable the inventive system to customize the web page appearances in order to make it appear like an eCommerce vendor's web site. The ship type record 438 includes information describing the manner in which a card and/or the accompanying gift are to be transported to the recipient. Record 442–454 include the information fields and field descriptors, as illustrated in FIG. 4B, useful in administering the inventive system. The records 402–460 of database 280 are related. In particular, a specific entry of one table may be used as an index into a record of another table, as illustrated in the listing below in which each entry has the form:

| [Tablename.Fieldname] | REFERENCES [Tablename.Fieldname] |
|---|---|
| [Category.CatParentId] | REFERENCES [Category.CatId] |
| [ClientCat.CCatParentId] | REFERENCES [ClientCat.CCatId] |
| [Aspobj.AOAspId] | REFERENCES [Aspmas.AspId] |
| [CardKeyword.CKCatId] | REFERENCES [Category.CatId] |
| [Charity.CharityCountryId] | REFERENCES [Country.CountryId] |
| [Client.CltCCatId] | REFERENCES [ClientCat.CCatId] |

-continued

| [Tablename.Fieldname] | REFERENCES [Tablename.Fieldname] |
|---|---|
| [ClientKeyword.CKCCatId] | REFERENCES [ClientCat.CCatId] |
| [ClientMailInfo.CMIShipCountryId] | REFERENCES [Country.CountryId] |
| [FreightRates.FCountryId] | REFERENCES [Country.CountryId] |
| [FreightRates.FSTId] | REFERENCES [ShipType.STId] |
| [Users.UserCountry] | REFERENCES [Country.CountryId] |
| [Users.UserCCType] | REFERENCES [CCType.CCType] |
| [Card.CardCatId] | REFERENCES [Category.CatId] |
| [Card.CardCharityId] | REFERENCES [Charity.CharityId] |
| [ClientLoc.CLocCltId] | REFERENCES [Client.CltId] |
| [ClientLoc.CLocCountryId] | REFERENCES [Country.CountryId] |
| [CltProfile.CPAOAspId & CPAOId] | REFERENCES [Aspobj.AOAspId.AOId] |
| [CltProfile.CPCltId] | REFERENCES [Client.CltId] |
| [Invoice.InvUserId] | REFERENCES [Users.UserId] |
| [Invoice.lnvCountryId] | REFERENCES [Country.CountryId] |
| [Occasion.OccShipCountryId] | REFERENCES [Country.CountryId] |
| [Occasion.OccOccCatId] | REFERENCES [OccCategory.OccCatId] |
| [Occasion.OccUserId] | REFERENCES [Users.UserId] |
| [UserTrans.UTUserID] | REFERENCES [Users.UserId] |
| [CardDet.CDUserId & CDTransId] | REFERENCES [UserTrans.UTUserID & UTTransId] |
| [CardDet.CDCardId] | REFERENCES [Card.CardId] |
| [CLocStats.CLSCltId & CLSLocId] | REFERENCES [ClientLoc.CLocCltId & CLocId] |
| [ClocStats.CLSStatsID] | REFERENCES [Statistic.StatsId] |
| [UserGift.UGCLocCltId & UGOLocId] | REFERENCES [ClientLoc.CLocCltId & CLocId] |
| [UserGift.UGUserId & UGTransId] | REFERENCES [UserTrans.UTUserID & UTTransId] |
| [CardDetDet.CDDSrno] | REFERENCES [CarDet.CDSrno] |
| [CardDetDet.CDDUserId] | REFERENCES [Users.UserId] |
| [CardGift.CGCDSrno] | REFERENCES [CardDet.CDSrno] |
| [CardGift.CGUGSrno] | REFERENCES [UserGift.UGSrno] |
| [CardShipInfo.CSICDSrno] | REFERENCES [CardDet.CDSrno] |
| [CardShipInfo.CSIShipCountryId] | REFERENCES [Country.CountryId] |
| [CardShipInfo.CSISTId] | REFERENCES [ShipType.STId] |
| [InvDetl.IDGDSrno] | REFERENCES [CardDet.CDSrno] |
| [InvDetl.IDIInvNo] | REFERENCES [Invoice.Invno] |

WebServer Interface

Upon connection to webserver 260, either directly or through a hyperlink from the website of a vendor client, a network user is presented with a graphic user interface. The graphic user interface includes a number of web pages which are resident on web server 260 and through which the network user may navigate. The web pages include a number of menus and dialog boxes which allow the network user to interact with the web server 260, particularly with the selection of a card and entering of the necessary information for customization of the card and specifying a recipient address. Sample web pages are illustrated in FIG. 6A-K and include various highlight options and dialog boxes through which a network user may interact with webserver 260.

Figure 6A:
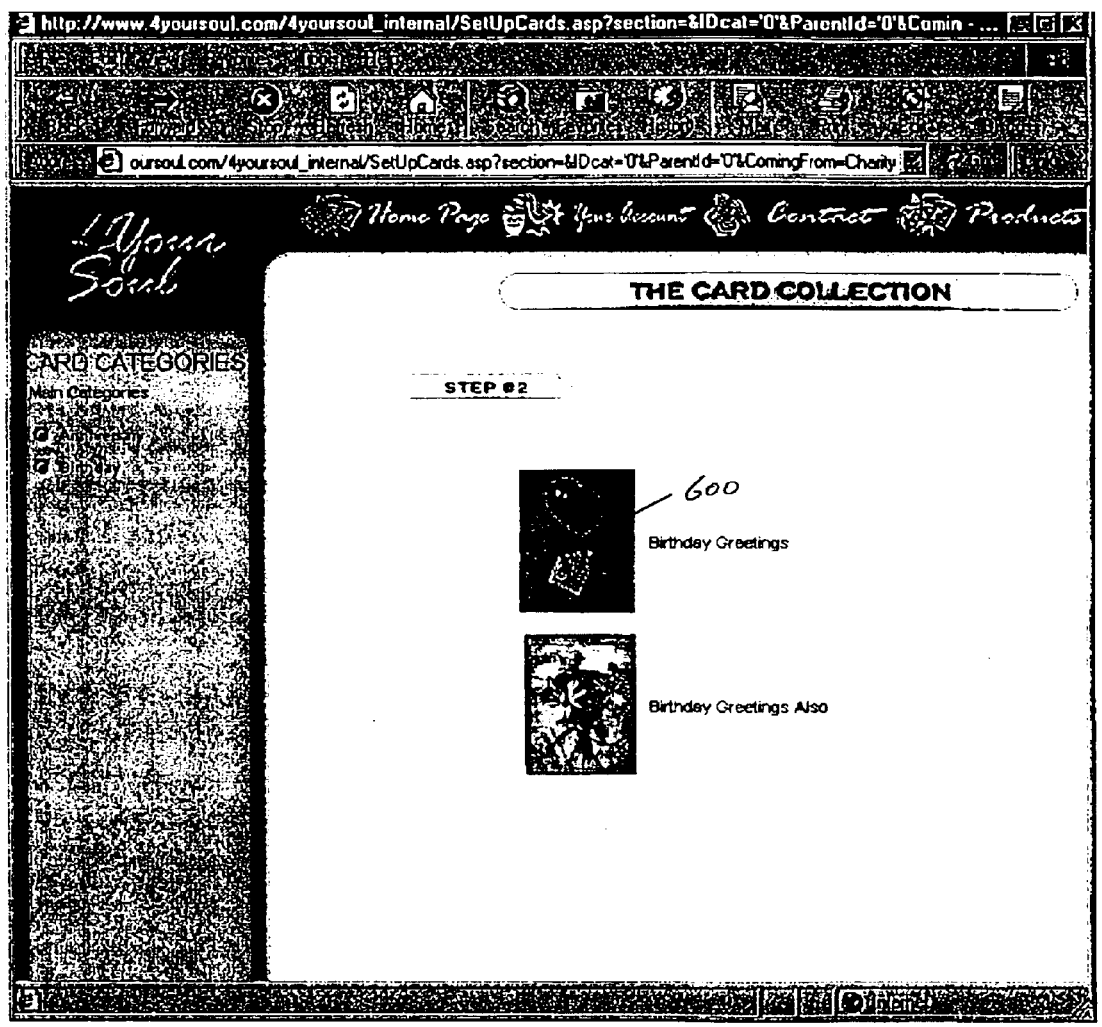
FIG. 6A is a screen capture of the graphic user interface of the inventive server illustrating a selection of cards in accordance with the present invention.

FIG. 6A is a screen capture of the graphic user interface of the inventive web server illustrating a selection of cards rendered in thumbnail size, in accordance with the present invention. In the illustrative embodiment, web pages rendered by webserver 260 appear to be an extension of the web site from which the network user was most recently connected, which as illustrated is 4YourSoul.com. In order to emulate the look and feel of a vendor's web page, the inventive system stores within a database 280, particularly tables 436 and 434, a client identifier and data identifying the appropriate backgrounds, color schemes, font sizes, font styles, font colors, logos, and other graphic or sonic elements etc. which emulate the look and feel of the client web site and give the network user the impression that he/she is still connected to the vendor's web site. To accomplish the above illusion, a client identifier may be passed along with the hyperlink to web server 260. Web server 260 then uses the identifier to retrieve the appropriate parameters from tables 436 and 434 and other, as necessary, for rendering the web pages and graphic user interface in a manner which is similar to those of the vendor from whom the network user recently purchased goods or services. If a network user connect directly to the inventive system, the graphic user interface of the inventive system may be used.

Figure 6B:
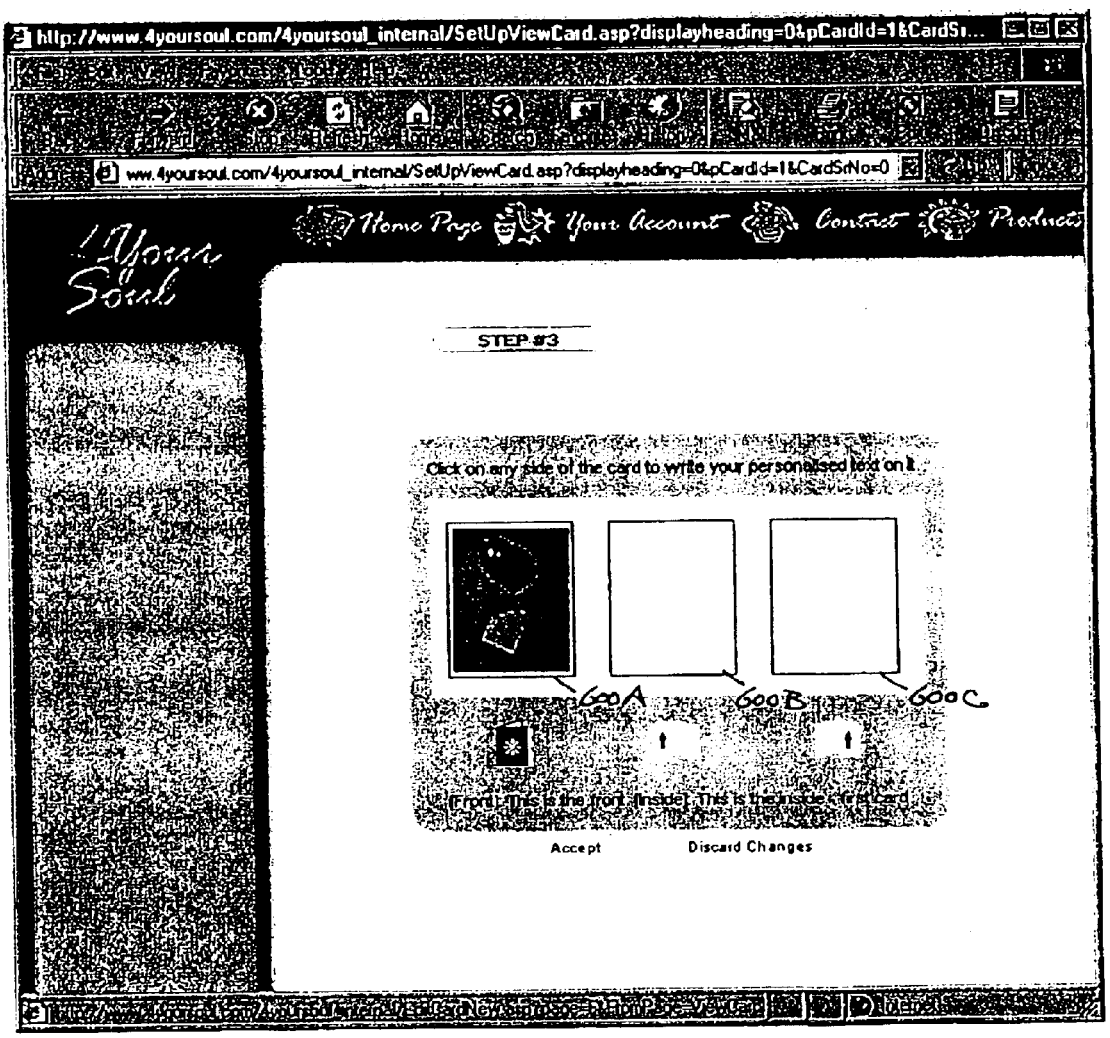
FIG. 6B is a screen capture of the graphic user interface of the inventive server illustrating a the panels of a selected card in accordance with the present invention.
Figure 6C:
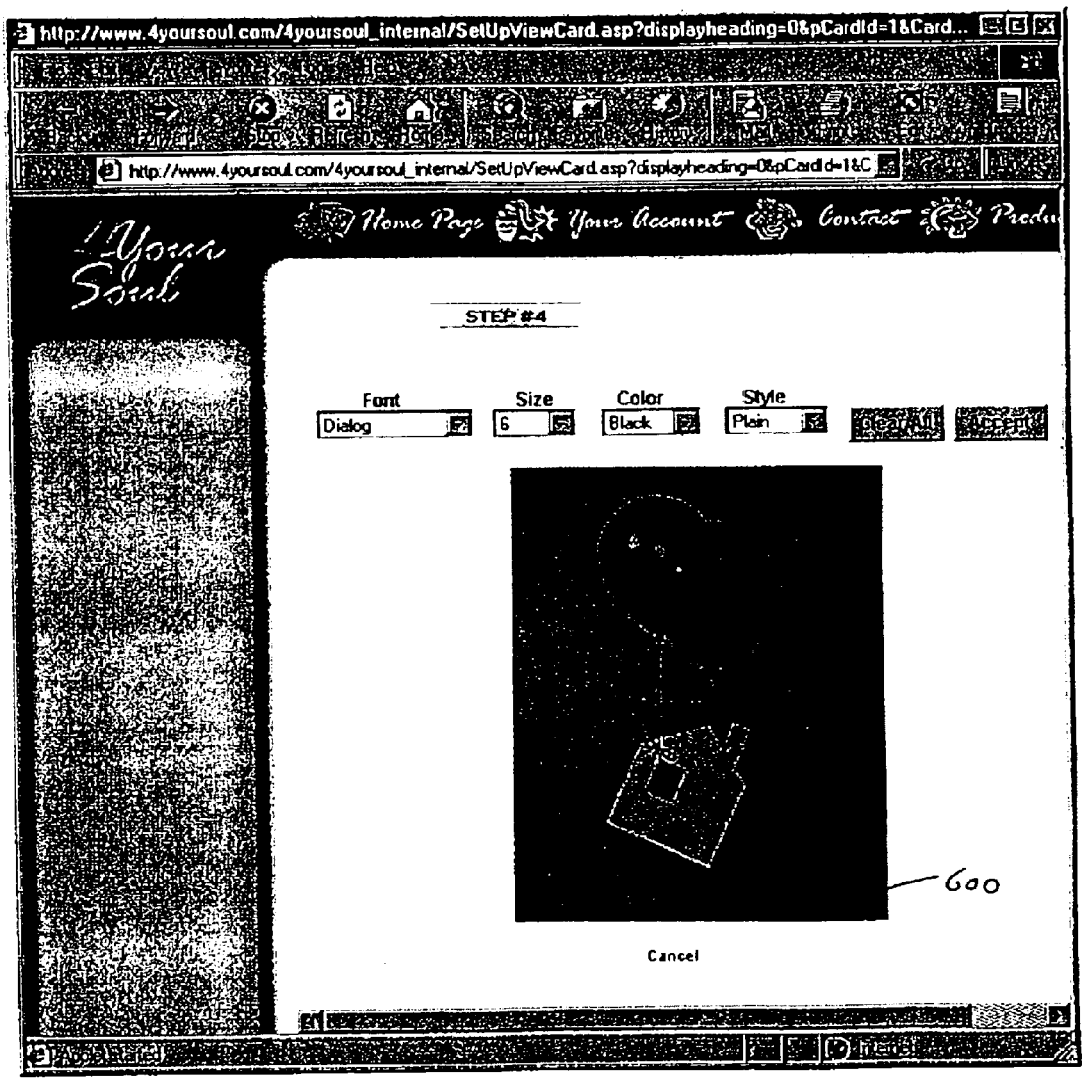
FIG. 6C is a screen capture of the graphic user interface of the inventive server illustrating an uncustomized card in accordance with the present invention.

In the illustrative embodiment, card 600 along with the other selectable cards are stored in a number of different formats and sizes. For example, to facilitate selection and customization, cards may be stored in database 280 as files in a thumbnail, intermediate and editable size. FIG. 6A is illustrates a selection of cards rendered in thumbnail size. FIG. 6B illustrates a card 600 in the intermediate size, as would be viewed by a network user following selection of the card. FIG. 6C illustrates a card 600 in editable size, as would be viewed by a network user during customization of the card. In database 280, the card files comprise graphical data, for example in bit map, .tif, .jpeg or other format, and may be arranged categorically according to particularly themes or occasion, e.g. birthdays, anniversaries, weddings, etc.

A fourth version of each card, from which the card is actually printed, is stored in any of databases 241, 239 and 218 of FIGS. 2–3. In these databases, the cards may be stored as an encrypted blob, e.g. a binary data file, for security purposes. This format may be obtained by encrypting the graphic data file of the card, for example, a .jpeg file, into a blob using any number of known commercially available encryption tools.

FIG. 6B illustrates card 600 as would be viewed by a network user on a web page 600 following selection of the card. As shown, card 600 is displayed with three panels 600A–C similar to the manner in which a card is viewed in hard copy or tangible form. A fourth side, 600D, not shown, may contain copyright information, vendor tracking information and various logos and trademarks of companies, as well as, possibly, the recipient's information.

Figure 6D:
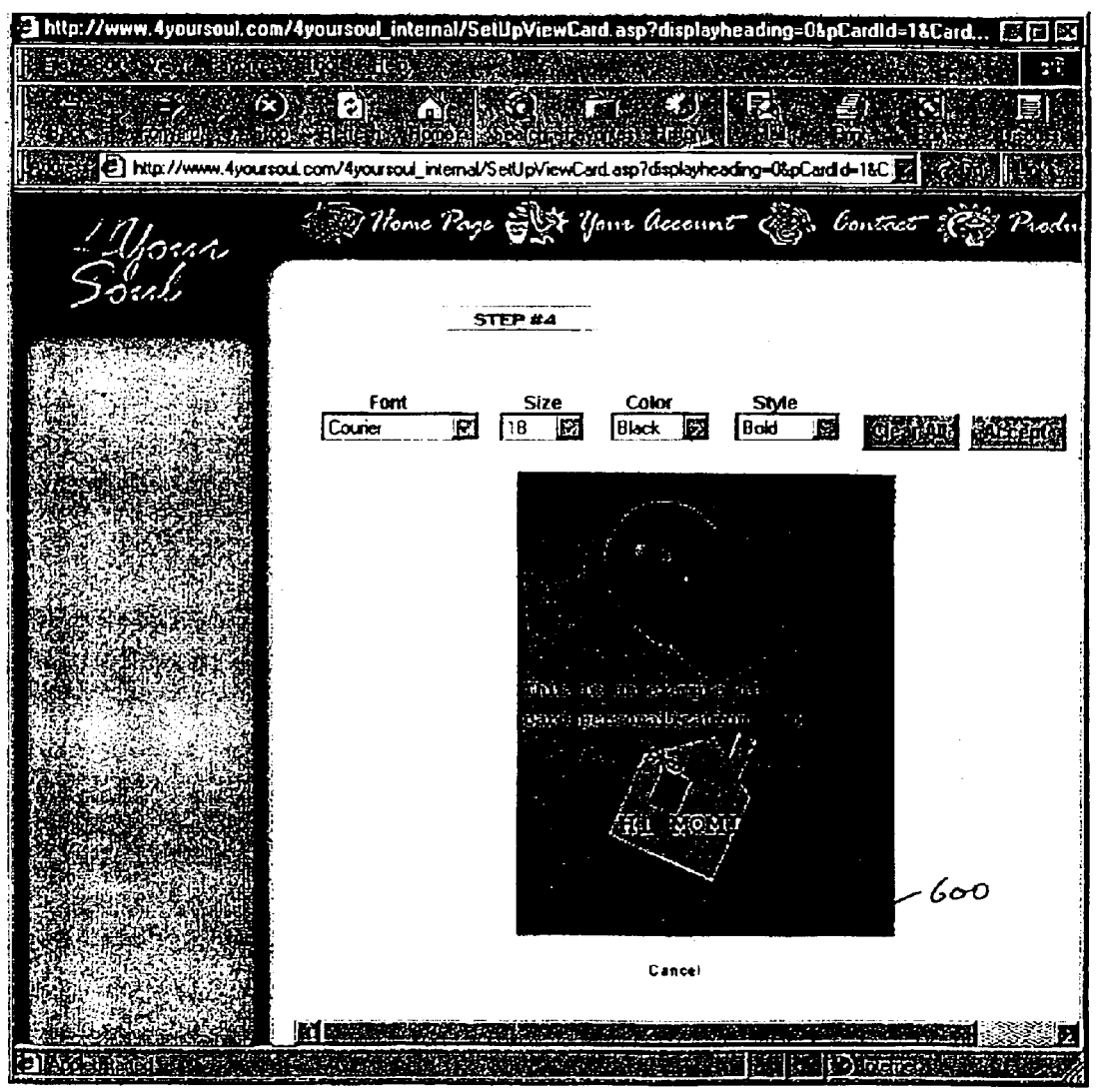
FIG. 6D is a screen capture of the graphic user interface of the inventive server illustrating a customized card in accordance with the present invention.

FIG. 6C illustrates card 600 as would be viewed by a network user in uncustomized form, in accordance with the present invention. Having selected a card, a network user utilizing a pointing device, such as a mouse or pen, designates the coordinates on the card at which text or graphics are to be placed, and, thereafter, enters the customizations to the card, for example by typing in the text to be added to the card at the designated location. In addition, the user selects the font type, font style, font color and font size of the text. In an alternative embodiment of the invention, the user is able to transmit scanned data representing hand written text or graphics to web server 260 and view the scanned data. Alternatively, the user may transmit a file containing photographic or other graphic data to be integrated into the card. FIG. 6D illustrates card 600 as would be viewed by a network user in customized form, in accordance with the present invention.

Control module 266 of web server 260 receives the coordinate information and other information describing the user's customizations, as recorded in customization table 408 and renders the card and the customizations in a What You See is What You Get (WYSIWYG) manner for viewing by the network user, as illustrated in FIG. 6D. In this manner, rather than just entering text into a dialog box for placement in a predetermined location, the user is free to place a customized message in any of text, cursive hand writing, graphics or photographs any where on panels 600A–C and view the card and customizations together in a manner which approximates signing a hard copy card. The WYSIWYG module which enables recording of a card with customizations from a network user is described in further detail herein. Control module 266 includes algorithms which detect the nature of the data transmitted by the network user and formats the data appropriately for presentation to the use. In the case of scanned data, control module 266 utilizes optical character recognition algorithms to separate and eliminate any background information from meaningful characters in the scanned data. In the case of photographic or graphic data files, control module 266 attempts to recognize the data format and render the data within the parameters of the designated panel including any required sizing or clipping of images to for the panel. FIGS. 6C–D illustrate a card 600 as displayed on web page, as seen by a network user in both stock, i.e., unmodified, and customized, i.e., modified form, respectively.

FIGS. 6E–K illustrate other web pages, in accordance with the inventive system, as would be displayed to a system user who is utilizing the reminder service of the inventive system. The reminder service enables a network user to enter various information about upcoming events, including dates, descriptions and recipients. The reminder service notifies the network user via e-mail of an up coming event and enables the network user to select cards for the designated recipients using the system described here.

The construction of web pages containing the appropriate dialog boxes and pull down menus is within the scope of those reasonably skilled in the arts and will not be described in further detail hereinafter for the sake of brevity.

Method of Operation

Figure 7A:
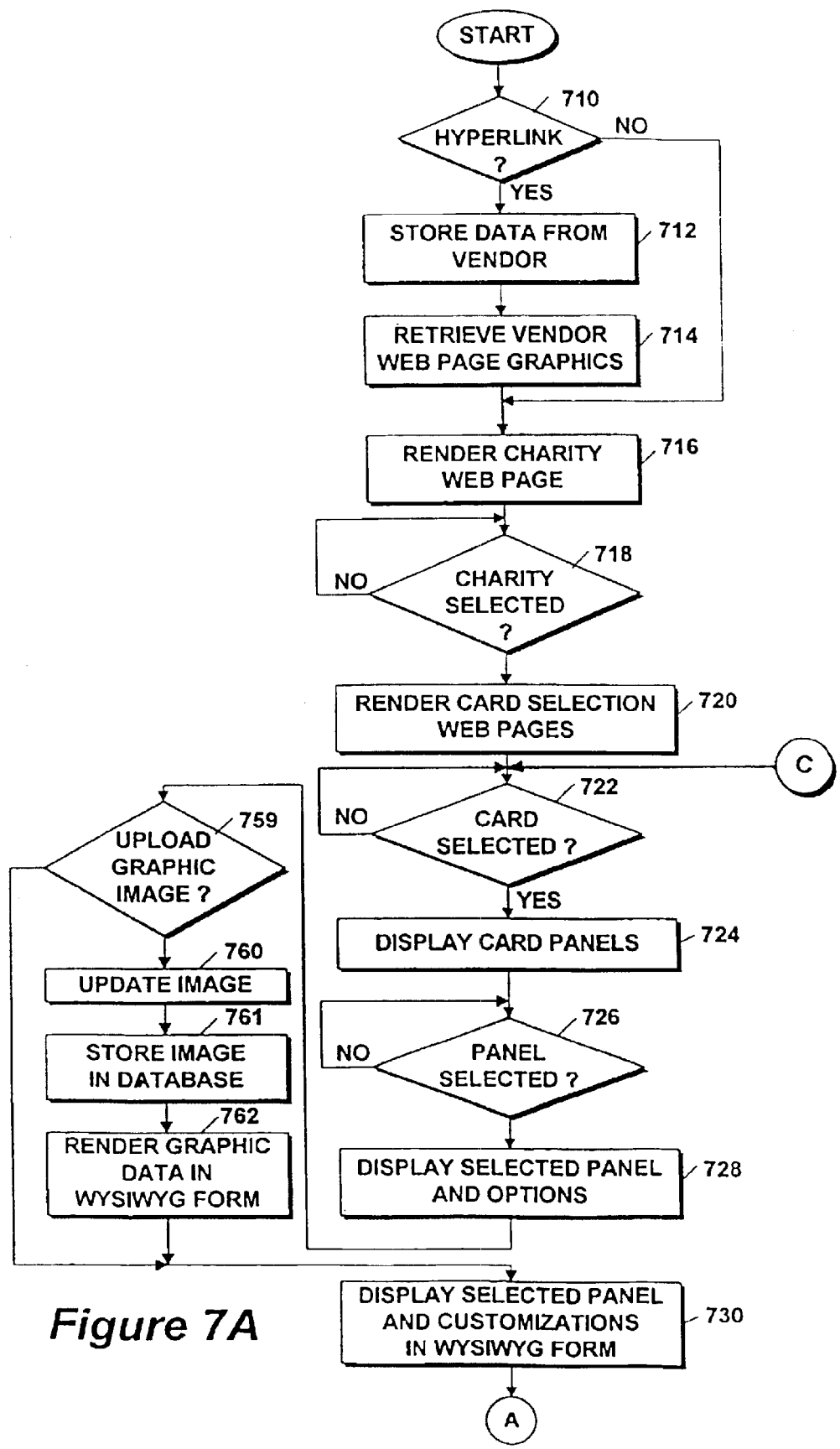
FIG. 7 is a flow diagram illustrating the processes of customizing/creating a card in accordance with the present invention.
Figure 7B:
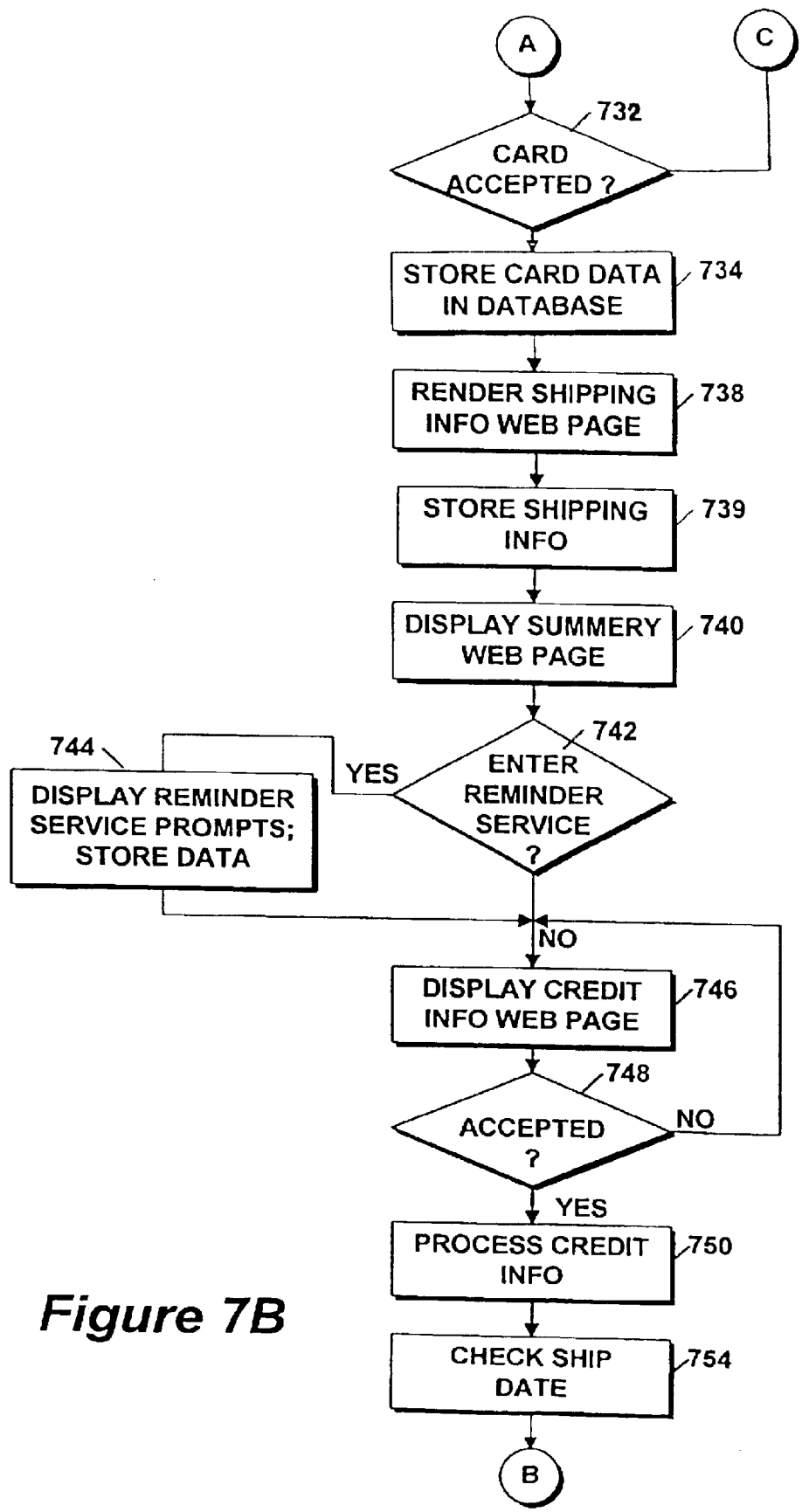
Figure 7C:
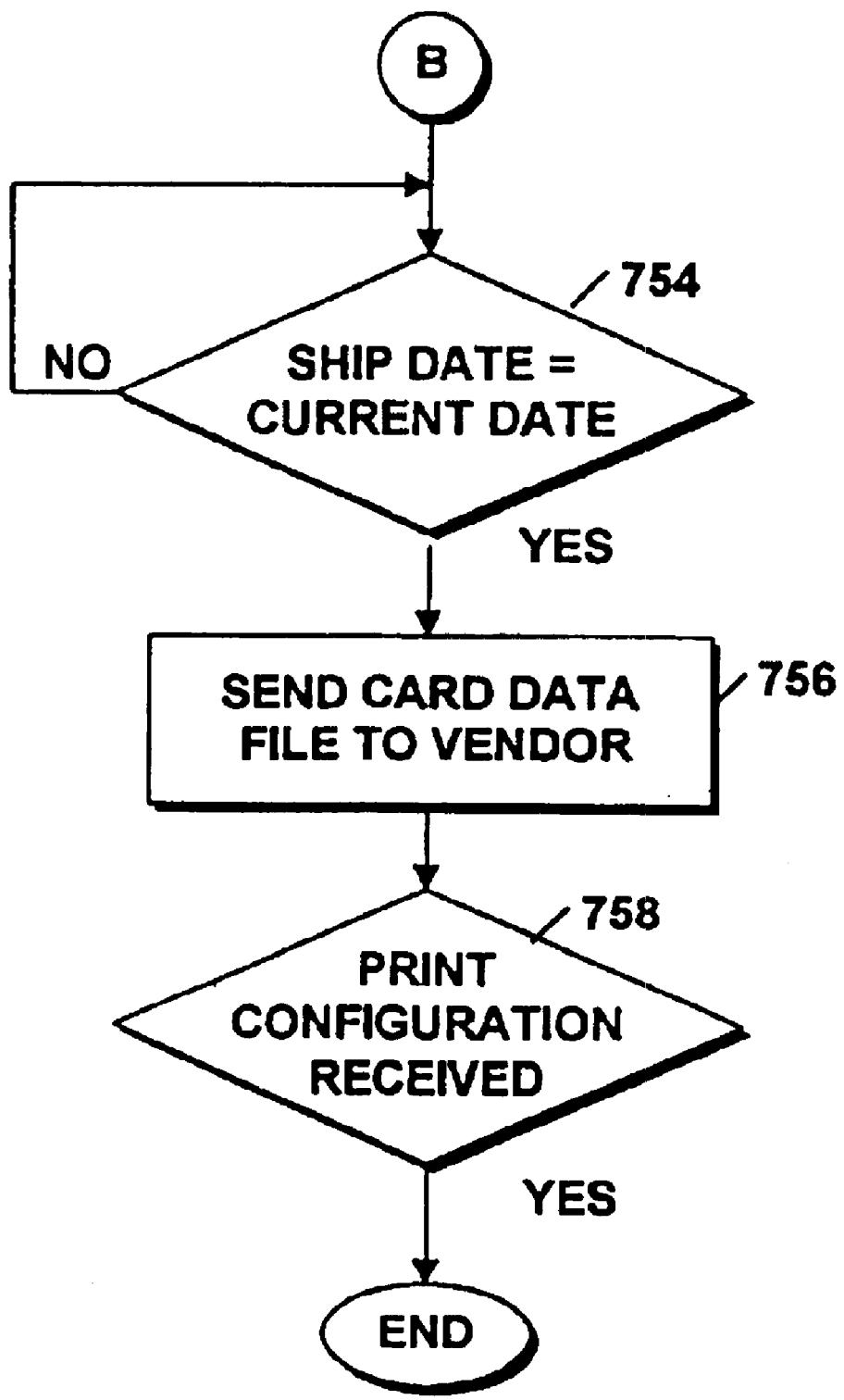

FIG. 7. is a flow diagram illustrating the process steps of the inventive method to enable a network user to select, customize/create and purchase a card from an eCommerce vendor for shipment with a gift or service purchased from the eCommerce network by the network user. Generally, a network user will be connected to system 250 either from a hyperlink from a vendor site or by directly connecting to server 260. When the network user is shopping on-line at an eCommerce vendor's site, and after the user has paid for his/her purchases, the network user is offered the option to order and create a custom card using the system previously described herein. If selected, the customer or network user is redirected, via a hyperlink from the client's website to the website of the inventive system, as illustrated by step 710. When the network user is redirected to web server 260, the vendor will provide web server 260 with a data structure 900, as illustrated in FIG. 9. In the illustrative embodiment data structure 900 comprises a plurality of data fields including Invoice Number field 902, User Email field 904, Credit Card fields 906–914, Credit Card address fields 916–924, Client Identification Number field 926, and Gift List field 930, as explained in greater detail hereinafter. Invoice Number field 902 represents the verdor's invoice number for a transaction. User Email field 904 represents the email address of the user who has bought items at the vendor's web site. Credit Card Name 906 represents the name on the user's credit card. Credit Card Number field 908 represents the user's credit card number. Credit Card Exp. Year filed 910 represents the user's credit card expiration year. Credit Card Exp. Month field 912 represents the the credit card's expiration month. Credit Card Type field 914 represents the user's credit card type, e.g. American Express, Visa, Master, Card, etc. Credit Card Street1field 916 and Credit Card Street2field 918 represents the user's street address on the credit card. Credit Card City filed 920, Credit Card State field 922, and Credit Card Zip field 924 represents the user's city, state and postal zip code, respectively, on the credit card. Client Identification Number field 926 is used to identify the verdor from which the network user is being linked.

Gift List 930 represents a list of items purchased by the network user at the vendor's web site. Each item in Gift List 930, in turn, comprises an Invoice Line Item Number field 930A, SKU field 930B, Gift Description field 930C, Distribution Location Number field 930D, Date of Shipment field 930E, Ship To Person field 930F, Ship To City field 930G, and Ship To State field 930H, as explained in greater detail hereinafter. Invoice Line Item Number field 930A represents the line item number of the subject item on the vendor invoice. SKU field 930B represents the vendor product identification number. Gift Description field 930C represents a short description of the gift purchased. Distribution Location Number field 930D represents the vendor warehouse identifier from where the vendor will ship the subject specific gift, and, consequently, from which vendor system the card will be printed. Date of Shipment field 930E represents the date the vendor will ship the subject gift. Ship To Person field 930F represents the person to whom the subject gift will be shipped. Ship To City field 930G represents the city to which the subject gift will be shipped. Ship To State field 930H represents the state to which the gift will be shipped. Any number of additional items 932 may have a similar format to Gift Item 930.

In the illustrative embodiment of the invention, the data contained within data structure 900, particularly the credit card number and related information, may be encrypted using any number of commercially available software encryption products, such as those available from RSA Data Security Systems, Inc. The data structure would be encrypted at the vendor site and decrypted, as necessary by the inventive system 250.

Next, the various fields of data structure 900 are stored in database 280, and, where applicable, decrypted, as illustrated by step 712. The information about a user, the email address field, credit card information, etc. is stored in a User record 402 of the User table. The information about the gift purchased at the vendor web site is stored in User Gift Table 414.

Web server 260 then presents to the network user one or more web pages that make up a inventive graphic user interface that appears similar to that of the vendor from which the user was hyperlinked, as illustrated by step 714. The value of Client Identification Number field 924 identifies the vendor from which the network user is linking and is used as an index into tables ASPOBJ table 436 and ASPMAS table 434 to select the default colors, logos and graphics for that vendor, thereby creating the illusion that the network user is still shopping at the vendor's website. The information defining the graphics images required for each page for a specific vendor/client is stored in the Client Profile (CltProfile) table of database 280 and is rendered by web server 260.

Figure 6E:
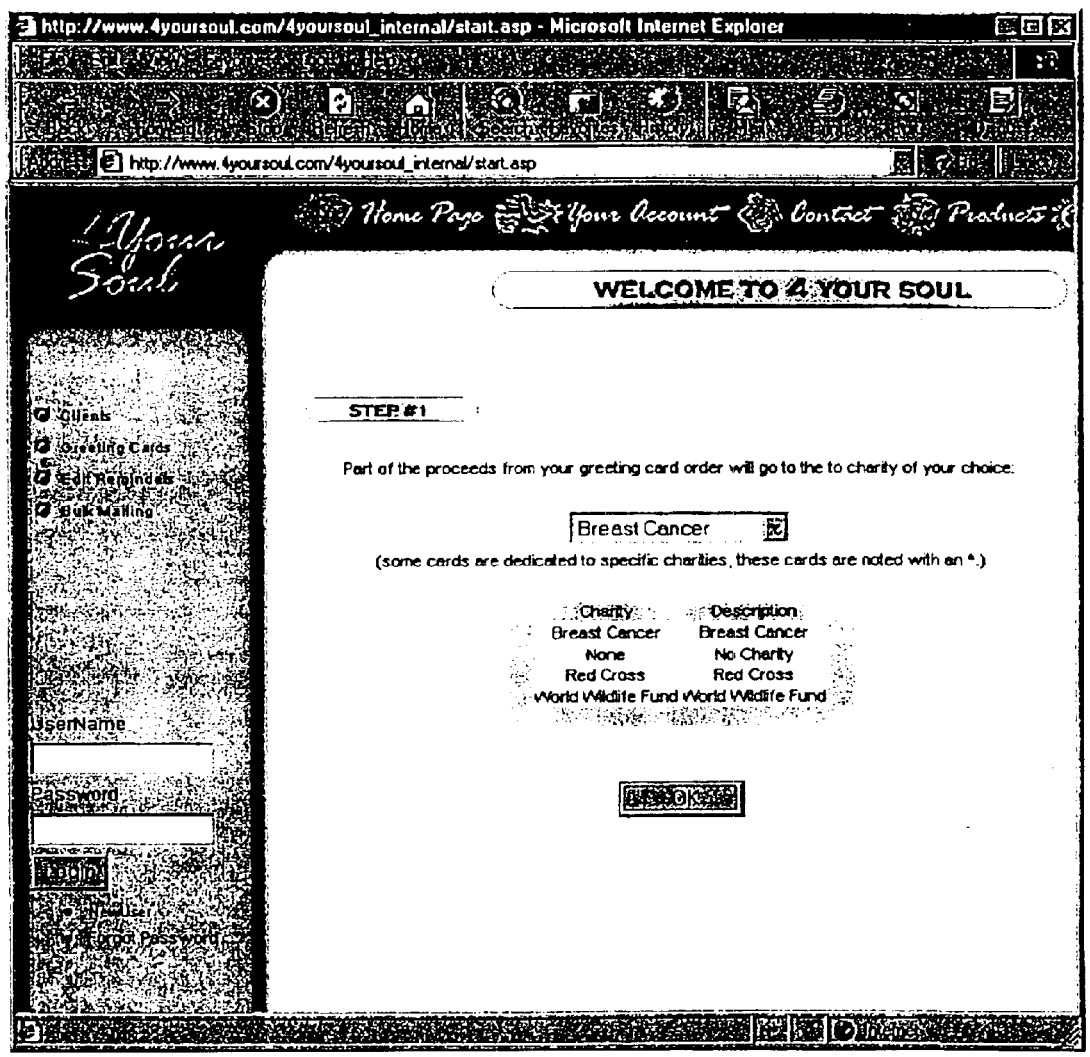
FIGS. 6E-K are screen captures of the graphic user interface of the inventive server illustrating various dialog screen through which a network user interacts with the system of the present invention.

In the illustrative embodiment of the invention, a portion of the proceeds of the sale of the card may be donated to charity. As illustrated in FIG. 6E, a web page is displayed allowing the network user to select a charity to which a portion of the sales will be donated, as illustrated by procedural step 716 and decisional step 718. If the network user is a registered user of the system, then the charity of their choice is shown by default. In either case, the user is allowed to change the charity to which the proceeds should be donated.

Next, web server 260 renders one or more web pages containing thumbnail images of cards. These web pages enable the network user to navigate through and select a card from database 280, as illustrated by procedural step 720. The network user can then choose a card by selecting the appropriate category and card, as illustrated by decisional step 722. Once the network user chooses a card, a web page illustrating three different panels (sides) of the card—the outside, the inner left, and the inner right—is rendered, as illustrated in FIG. 6B, and as illustrated by procedural step 724. The user can click on any panel of the card and the selected panel will be displayed in an editable format along with a number of dialog boxes which allow the network user to selectively customize the card using WYSIWYG technology.

As illustrated in FIG. 6C, the inventive system allows the user to choose a font, color, size, text and style of a customized message, as well as the location on the card panel at which the message will be received, as illustrated by decisional step 726 and procedural step 728. The user can then type text on the card and then move the text anywhere on the screen with a pointing device. Once written the user can edit the text, as well as change the color, font, size and/or the style of the text. The card and customizations are presented in a WYSYWIG format, by module 266, as illustrated by procedural step 730, and as illustrated in FIG. 6D. Module 266 receives the input parameters from the network user and renders the text in font, color, size, and style chosen and at the coordinated specified by the network user.

Module 266 may be implemented as a WYSIWYG application executing under the control of operating system on web server 260. Specifically, module 266 may be implemented as a JAVA application using object-oriented technology. Upon start-up, module 266 is provided with a list of parameters by web server 260. These parameters include the name of an image (card), the location of the image within the memory of web server 260, the dimensions of the image, and a list of instructions defining the position, color, size, font, style and text for each customization to be displayed on the card image. For a new card, which has not been customized by a network user, the list of instructions supplied to module 266 is empty, since there have been no customizations at that point. For a card that has been previously created or which is in the process of being edited, the parameter string supplied to module 266 may contain any of the information identified above. Module 266 creates a list of customization objects, each object storing information about a piece of text, such information including the actual text character string, the font, size, color, style, etc. and position data.

To avoid clutter in displaying the background image of the card as well as the customizations in WYSIWYG manner, module 266 displays one or more labels over the background of the card image. While editing the card, when a network user selects e.g., clicks with a mouse, a specific location on the card, module 266 reviews an internal list of customization objects maintained for that card to determine if the selected coordinates match the coordinates of any previously defined text object. If so, the text is displayed in an edit box with the font, style, size, etc., rendered according to the specification stored in the customization object. If the coordinates to do not match, a new empty box is displayed over the background of the card image using the customization characteristics selected by the network user from one or more menus. Once the network user saves a particular portion of text, the customization characteristics are stored in a customization object and the edit area is replaced with a corresponding label. The network user has the ability to select any text with a pointing device and drag the text around the background image of the card, thereby enabling the network user to position the text wherever desired. The background image of the card, along with the text, including the selected characteristics and position, are then rendered in a WYSIWYG manner enabling the network user to view the card as the card will look when printed.

If the network user desires to further modify any text customization to the card, they may simply do so by selecting the text object and then changing any of its characteristics, such as the color, size, style, etc, by simply clicking on the appropriate menus and choosing the desired option.

Once the network user has accepted all the customizations to the card, module 266 creates a string of customizations and forwards the attached string to a redirection URL that redirects the network user to a new page where the customization string data may be parsed and saved into the appropriate tables of database 280.

It will be obvious to others skilled in the art that the functionality of module 266, as described herein, may be implemented using different programming techniques other than object oriented technology and the JAVA programming environment.

In an alternative embodiment, as illustrated by the procedural steps 759–762, and to provide flexibility in personalization of cards, the network user may upload images that can be used to create custom cards. The network user can also upload scanned images of hand written messages and apply them to the card to create personalized graphics, photos or cursive fonts for the card. As shown in FIG. 7A, web server 260 determines whether a graphic image has been uploaded from the network client's system, as indicated by decisional step 759. If so, the image data file, which may represent graphical data in any number of standard formats or scanned data, is received by web server 260 and stored in the appropriate tables of database 280 as illustrated by procedural steps 760 and 761, respectively. Next, the file containing the graphic image data is rendered in WYSIWYG format in addition to or over the background image of the card, as illustrated by procedural step 762. In the illustrative embodiment, any number of commercially available software modules which render graphic data in a variety of different formats may be utilized to perform the functions illustrated by procedural step 762.

The network user is then given the option to accept all of the change(s) to the card, as illustracted by decisional step 732. The data representing the customizations to a card are stored in database 280, as illustracted by procedural step 734. For example, Card Detail Detail (CardDetDet) Table 408 stores the specific pieces of text, the position, the color, font, etc., as well as informtion for any image data, photographic or scanned, as in step 760, that has been uploaded to web server 260.

Figure 6F:
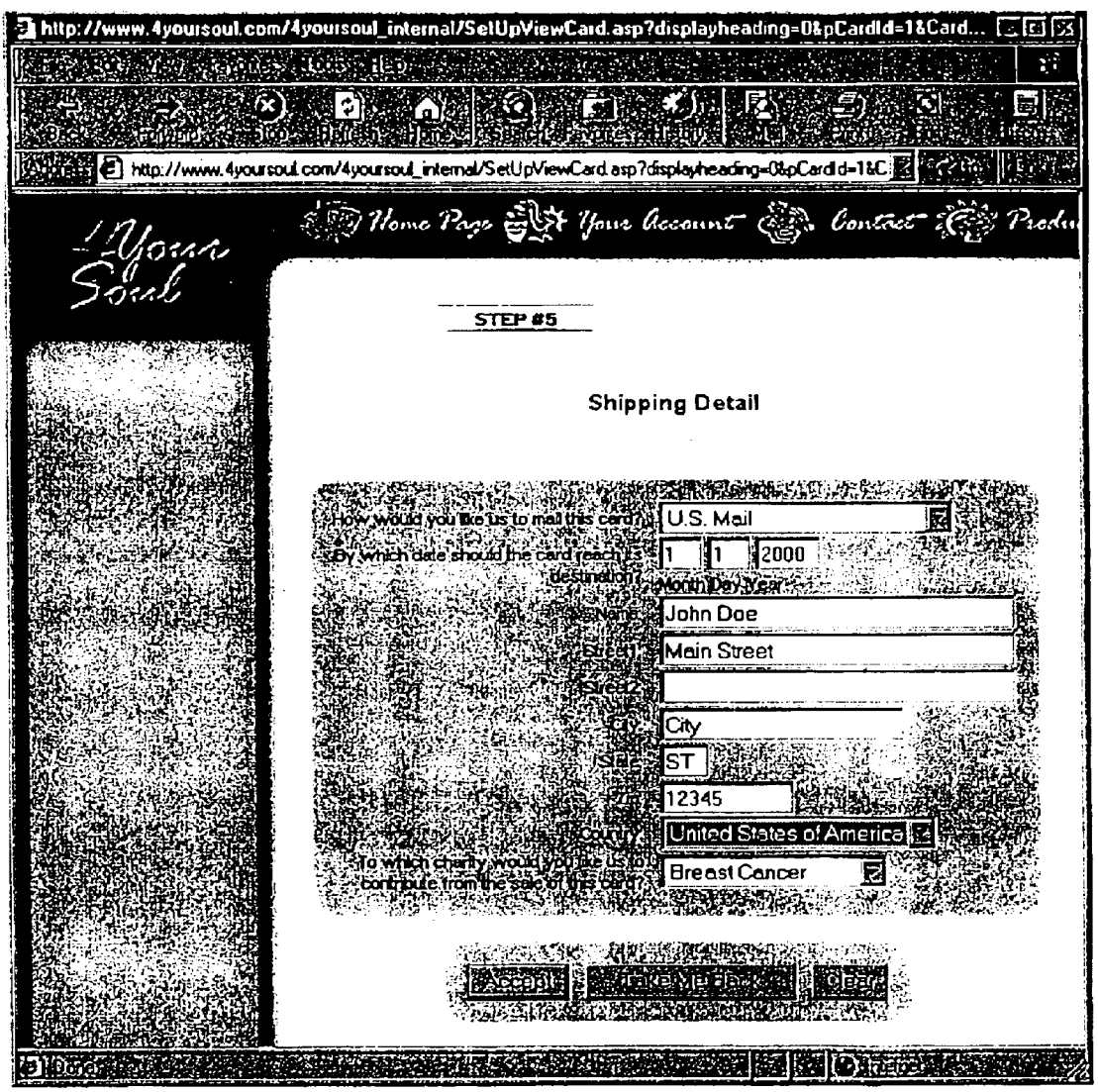

Next a web page, as illustrated in FIG. 6F will be rendered which allows the network user to specify information related to the recipient, as illustracted by procedural step 738. Card Detail (CardDet) Table 406 stored the macro information for a customized card, like ship date, price, shipping mode, the charity to which part of the procceds from this card will go, etc. Card Shipping Information (CardShipInfo) Table 412 stores postal address informtion. If the card is to accompany a gift, then there is no information entered in table 412. Card Detail (CardDet) Table 406 stores the macro information for a customized card. The storing of such information in database 280 is illustractes as procedural step 739.

Figure 6G:
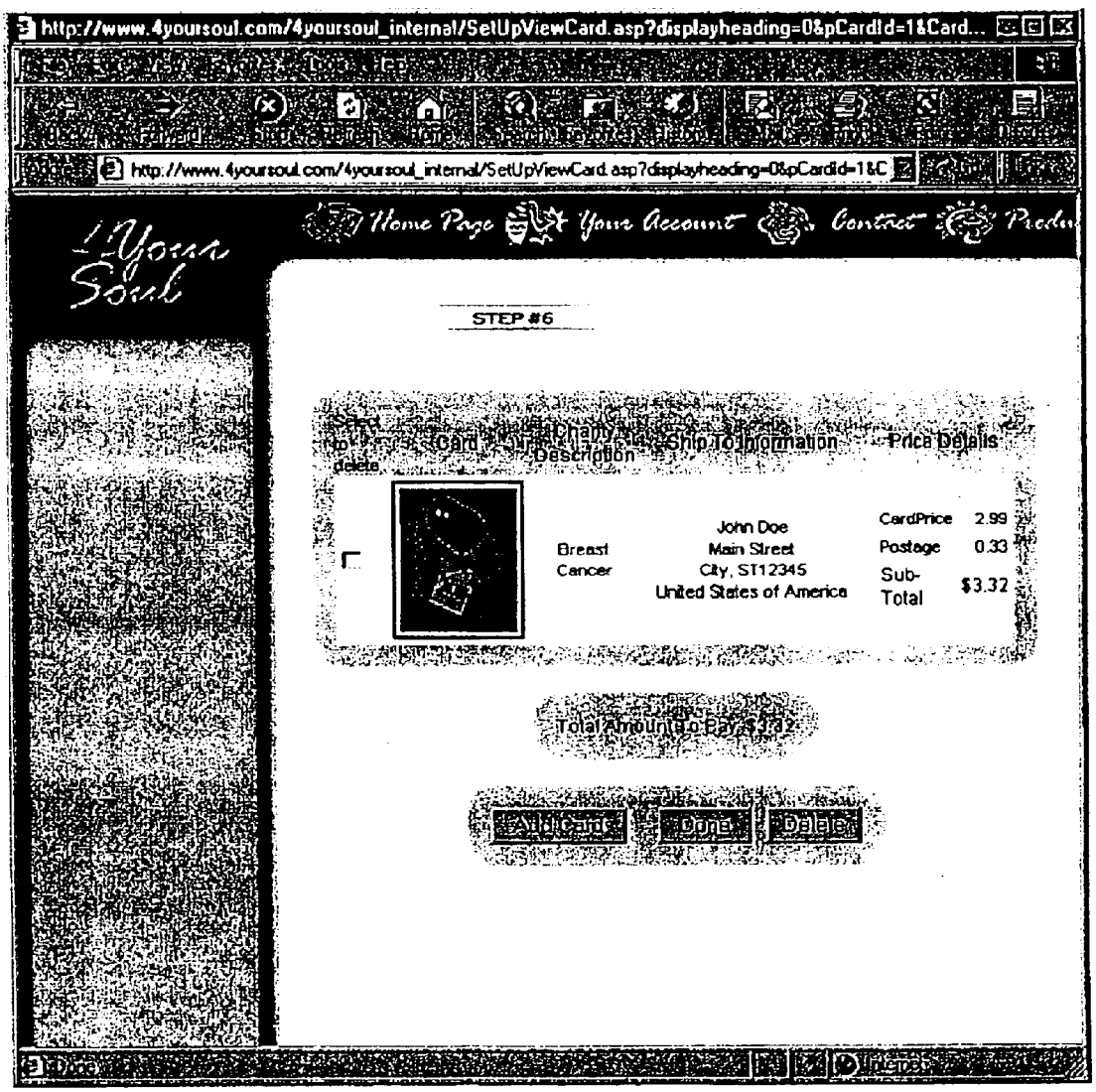

Next, the network user will be provided with a summary web page, as illustrated in FIG. 6G, which list the cards, charity, recipient information and price details, as well as with the option to add or delete cards, as illustrated by procedural step 740. At this point, the network user can edit any of the information or add or delete cards.

Figure 6H:
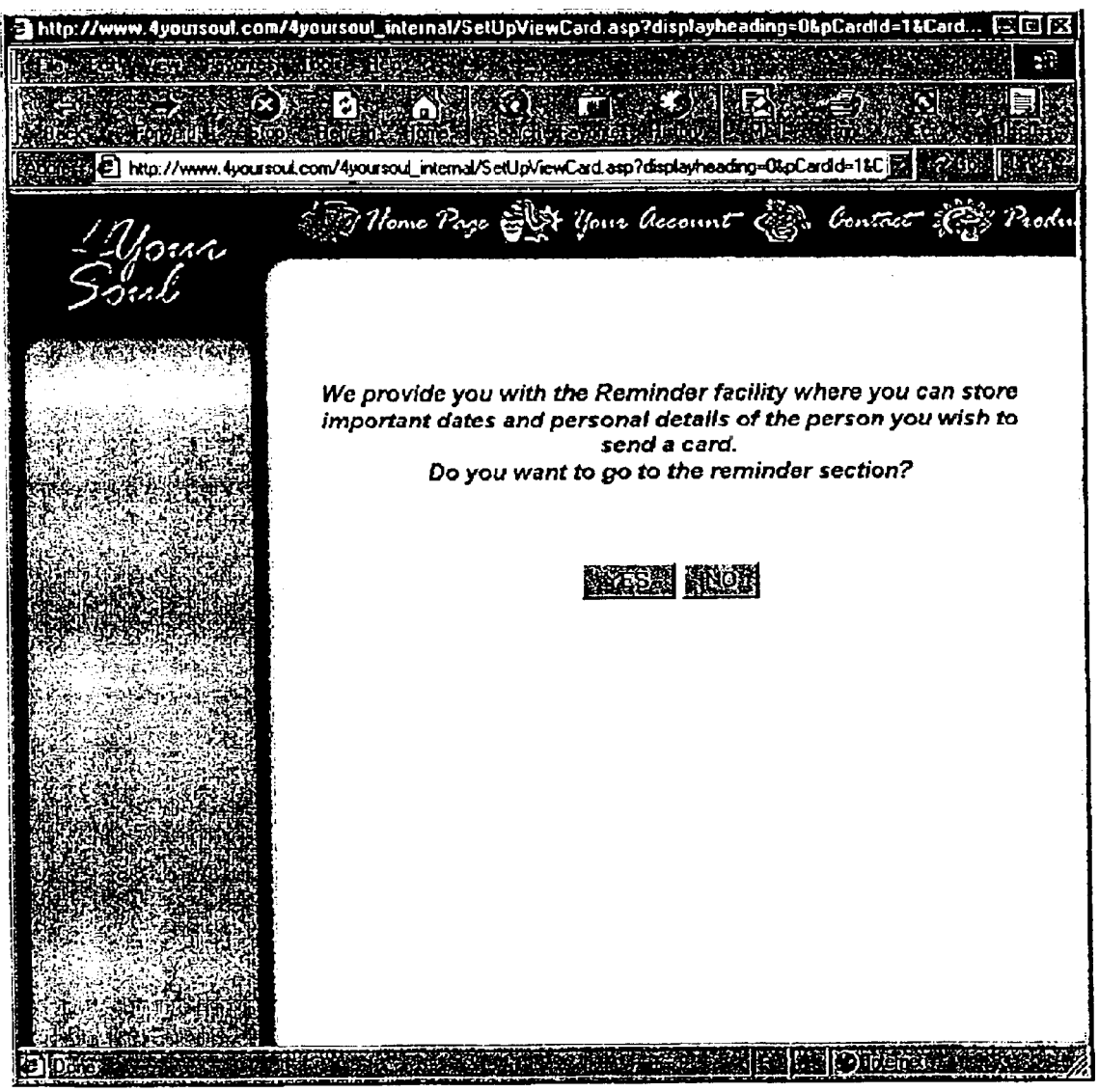
Figure 6I:
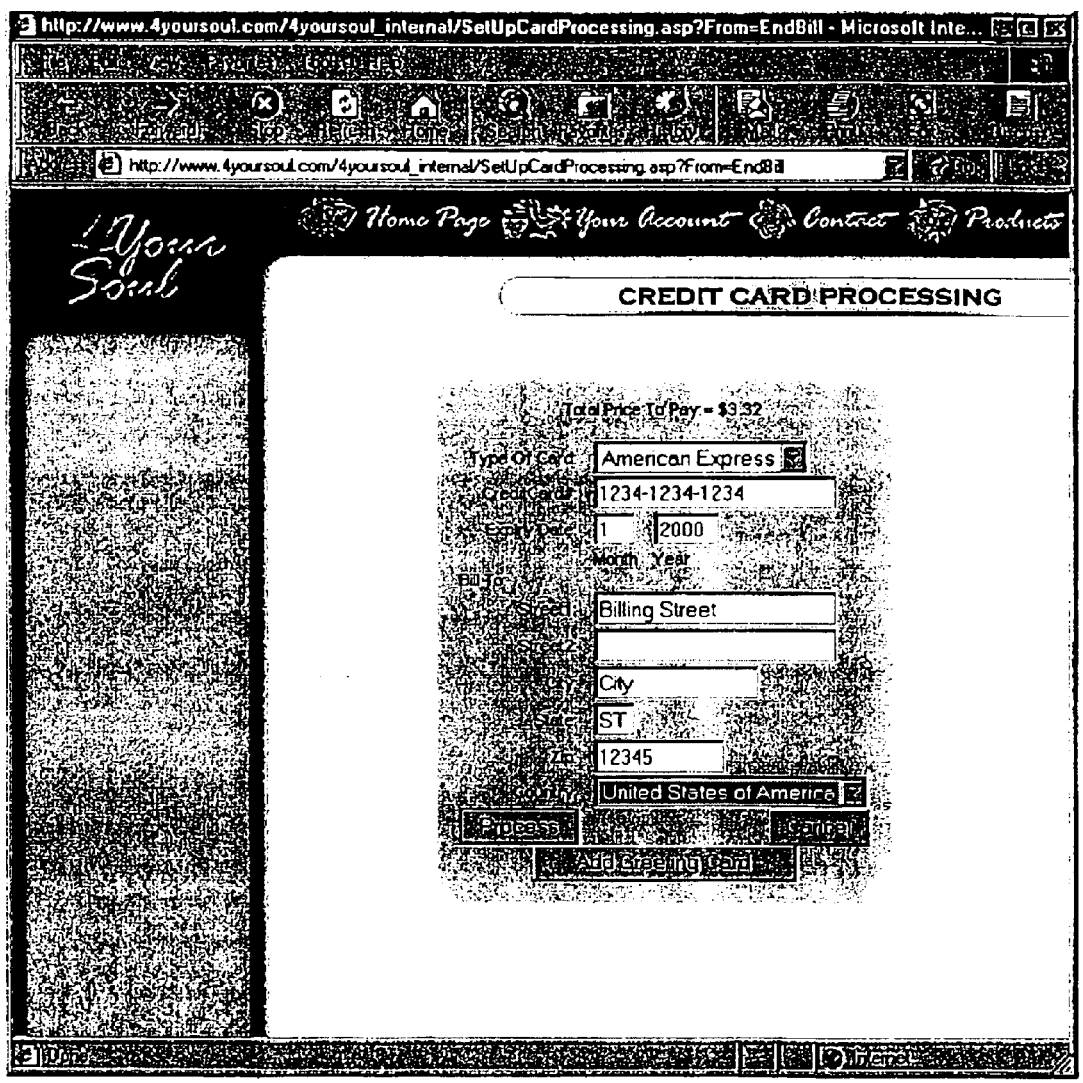
Figure 6J:
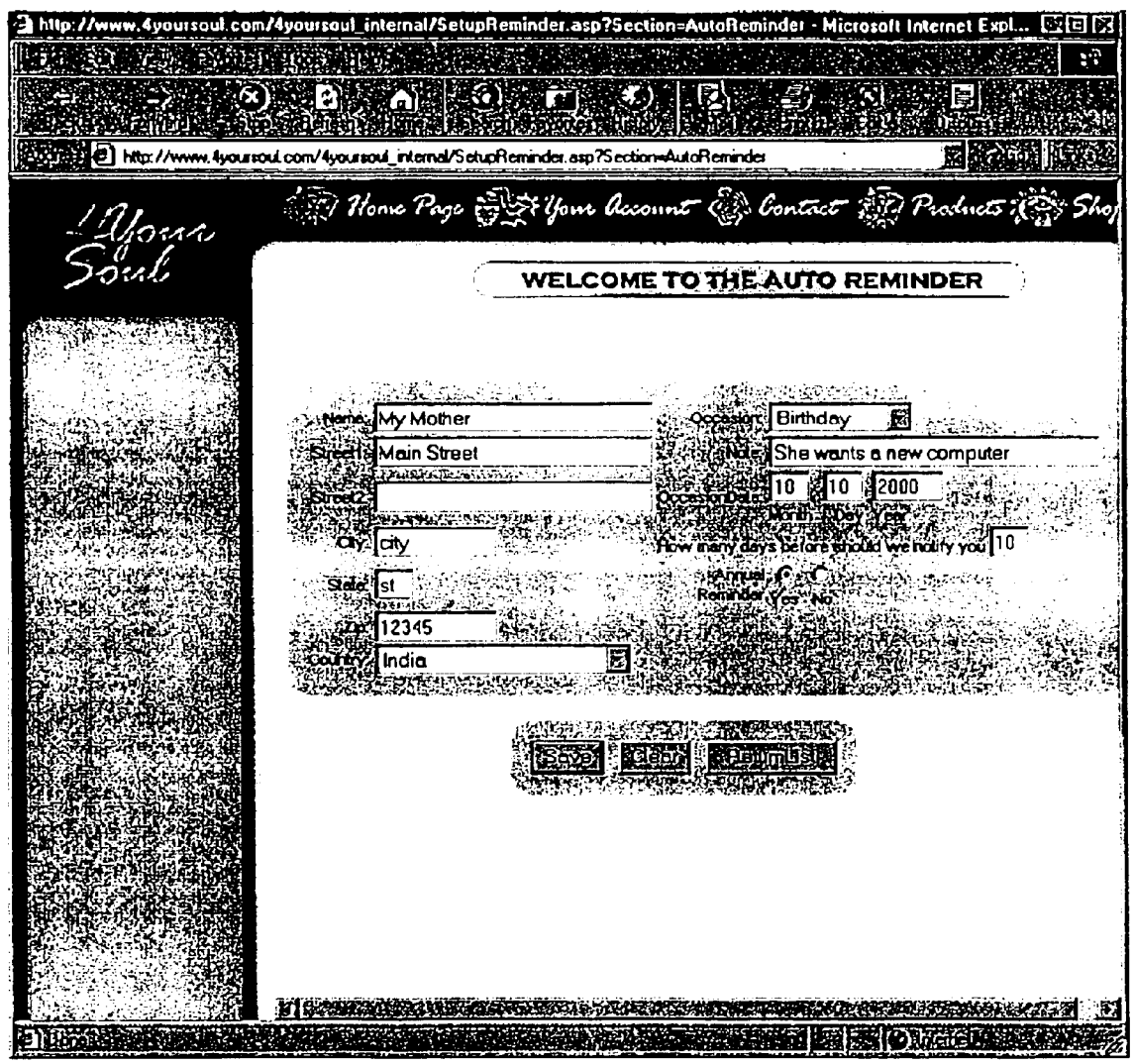
Figure 6K:
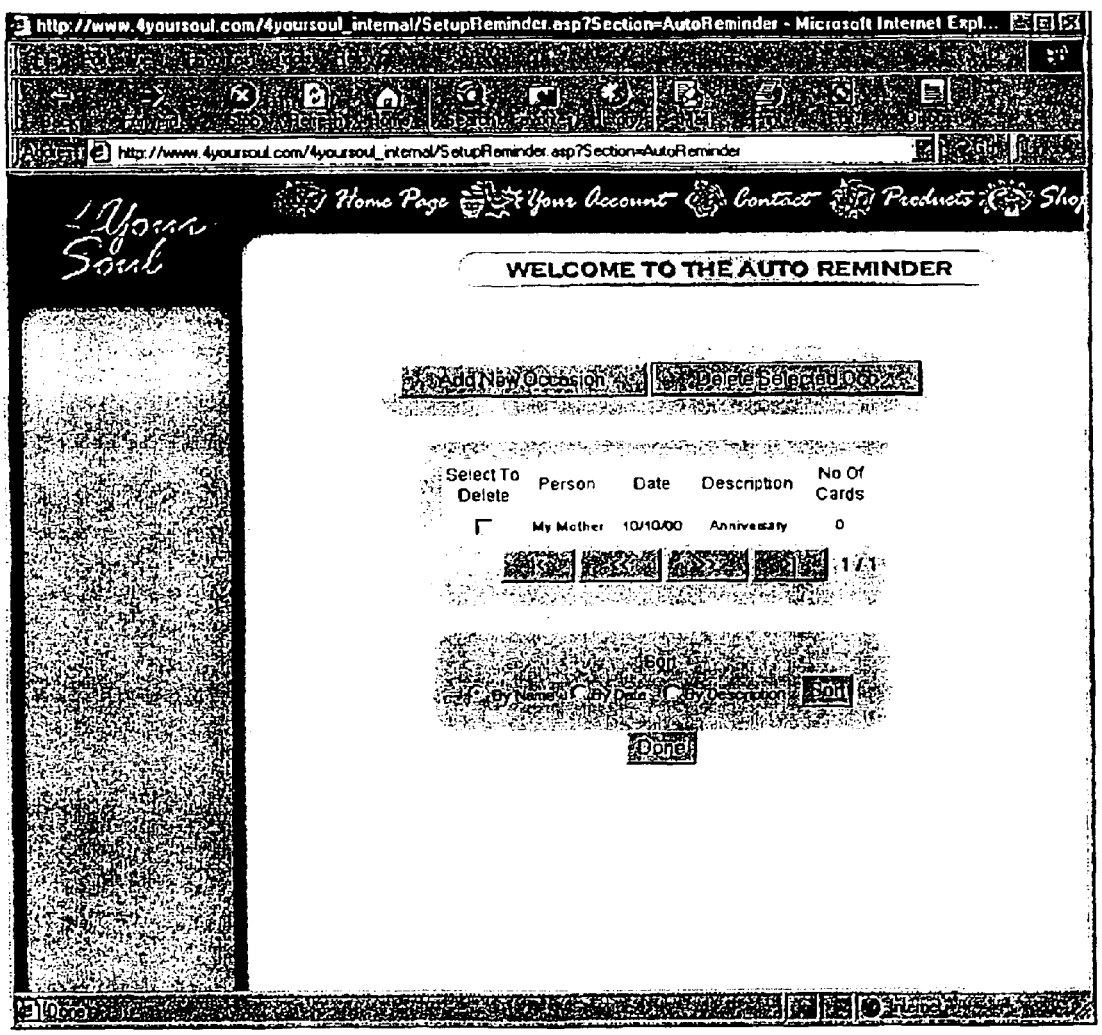

If finished, the network user will be prompted to visit the reminder service implemented in the inventive system, as illustrated in FIG. 6H, and as illustrated by decisional step 742. If the user chooses to enter the reminder service, web server 260 will render the web pages, as illustrated in FIGS. 6J and 6K, which prompt the user to enter the appropriate information, and as illustrated by procedural step 744. As illustrated, the reminder service allows a network user to enter various dates and description of occasions for which a reminder email will be sent prior thereto. In addition, the present invention allows the network user to select, customize/create and purchase cards, for mailing at an appropriate time in the future. For example, using the inventive system, a network user may select, customize and purchase birthday cards for selected friends and family members during a single session and have the card send to the designated recipient on the date designated by the network user. The data entered through the reminder service web page interfaces is stored in database 280. The email server 288 will send a reminder, for example, in the form of an email, to the network user prior to the occasion, as specified by the user. The Occasion Table 430 stores information regarding the specific events that the user wants to be reminded about. The Card Detail (CardDet) Table 406 stores any cards created in advance of an event. The CardDetDet and CardShipInfo Tables, 408 and 412, respectively, also store relevant information, as applicable.

After exiting the reminder service or, if in decision step 742, the network user opted not to enter the reminder service, the network user proceeds to checkout and payment, as illustrated by steps 746, 748 and 750. The network user is be provided with all the information that was received from the vendor regarding the user's credit card information, as illustrated in FIG. 6I and procedural step 746. If the information is acceptable, the network user selects the process option and the designated credit card will be charged the amount of the purchase. The information about the transaction is stored in database 280 and maintained to keep a historic record of the activity. The Invoice table 444 stores the credit card information which was used to pay for the transaction, the authorization code, etc. The Invoice Detail (InvDetl) Table 446 stores information at the line item level of the invoice in terms of which cards were charged on which invoice. The credit card information is transmitted from system 250 to a credit processing service, such as system 230 of FIG. 2 and as illustrated by procedural step 750. Once the transaction is processed a "Thank You" screen may appear, and the network user is returned to the vendor's web site. If at any time during the above described process a disconnect of the communication link between the network user and web server 260 occurs, an e-mail message is sent to the network user with a link back to web server 260.

Once the credit card transaction has been approved, web server 260 checks the Ship Date field of UserGift Table 414 to determine if the card is to be printed today, i.e. ship date equals current date, as illustrated by procedural step 752 and decisional step 754. If so, an email message will be sent to the vendor's distribution location to print the card, along with a file containing all of the information about the card, as explained hereinafter and as illustrated by procedural step 756. In case the card is to be sent at a later date, an email will be sent later. When the appropriate time comes to print the card, email server 288, will send a message to the appropriate the vendor location through, for example, email, Remote Procedure Call commands or MSMQ (Microsoft Message Queue). Once a day, at about midnight, or at another interval, a process on email server 288 sends emails to all the vendor locations regarding the cards to be printed during the day. There may be multiple emails sent to each vendor location. Each email will contain information for all the cards created by a single user during a single visit. The print process executing at the vendor system will send a message back to email server 288 indicating the card has been printed, as illustrated by decisional step 758, after which the process as for that card is concluded.

To print a card, web server 260 provides the vendor's distribution center, whether through an email or a batch process, the information from a user session, i.e., from the time the network user first connected to web server 260 until the user disconnects from web server 260. Since a network user may perform multiple transactions in a single session, the session information may include information for multiple transactions. In the illustrative embodiment, the session information may be transferred in a file 1000 having a format in accordance with the XML protocol. It will be obvious to those skilled in the art that other file formats or equivalent data structures may be used in place of file 1000. File 1000 is parsed and used to update database in the vendor system, as explained hereinafter.

File 1000 includes information from the UserGift table 414, i.e. records added to table 414 from a session, including data fields for the Invoice Number, Invoice Line Item Number, Gift Serial Number, Gift ID (SKU) Ship To Person Name, Ship To City, Ship To State, and Ship Date. The Invoice Number field represents the invoice number created by the vendor for the goods purchased by the network user at the vendor web site. The Invoice Line Item Number field represents the invoice line item number created by the Vendor. The Gift Serial Number field represents a unique identification number given by the inventive system to the gift item. The Gift ID field is the vendor identifier for the product, e.g., the SKU. The Ship To Person Name field represents the name of the person to whom the gift will be shipped. The Ship To City field represents the city to which the gift will be shipped. The Ship To State field represents the state to which the gift will be shipped. The Ship Date field represents the date required by the Vendor to print the card for the gift, e.g. the day it will leave the vendor's distribution location.

File 1000 includes information from the CardDet Table, i.e. information which regarding cards created and base card information, including data fields for the Card Serial Number, Card Id, and Card Status. The Card Serial Number field represents a unique identifier, e.g. a number, assigned to any card created at web server 260. The Card Id field represents card number, e.g. SKU, assigned to the card by the inventive system. The Card Status field represents the current status of the card, e.g. printed, to be printed, etc.

File 1000 further includes information from the CardGift table 426, i.e. information which associates a card with a gift and a network user, including data fields for the Card Serial Number, Gift Serial Number, User Id and Transaction Id. The Card Serial Number and Gift Serial Number fields have been previously defined. The User Id field represents a unique identifier assigned to a particular network user by the inventive system. The Transaction Id field represents a unique identifier assigned to by the inventive system to uniquely identify every session of a network user on the inventive system.

File 1000 further includes information from the CardDet-Det table, e.g. information regarding the text to be superimposed on the card or graphical information which will be superimposed. Such graphical information may include picture, photo or a scanned hand written message. The information from the CardDetDet table includes data fields for the Card Serial Number, Line Item Number, Card Page, X Position, and Y Position. The Card Serial Number field has been previously defined. The Line Item Number field represents a unique counter for every piece of customization in a given card. The Card Page filed identifies on which face or panel of the card the text will be printed. The X Position and Y Position fields identify the location of the text on the face of the card.

If part of the customizations to the card include text, then data fields for the Text Color, Text Font, Text Size, Text, and Text Style will be incorporated into file 1000. The Text Color field identifies the color in which the text will be rendered. The Text Font field identifies the font in which the text will be rendered. The Text Size field identifies the size of the font in which the text will be rendered. The Text field identifies the subject matter which will be rendered. The Text Style field identifies the style of the font in which the text needs to be rendered.

Otherwise, if part of the customizations to the card include an image, an Image Name field, identifying the name of the attached file which will be superimposed onto the card, will be included with file 1000. A sample file 1000 in XML format is set forth below.

```
<?XML VERSION="1.0"?>
<Print>
<VERSION>Print Info 1.0</VERSION>
    <Transactions>
        <Transaction>
            <UserGifts>
                <UserGift>
                    <UGInvNo>123123</UGInvNo>
                    <UGInvLINo>1</UGInvLINo>
                    <UGSrno>332</UGSrno>
                    <UGGiftId>1</UGGiftId>
                    <UGShipPerson>Sandy</UGShipPerson>
                    <UGShipCity>Mumbai</UGShipCity>
                    <UGShipState>MH</UGShipState>
                    <UGShipDate>1/12/1999</UGShipDate>
                </UserGift>
                <UserGift>
                    <UGInvNo>123123</UGInvNo>
                    <UGInvLINo>2</UGInvLINo>
                    <UGSrno>333</UGSrno>
                    <UGGiftId>2</UGGiftId>
                    <UGShipPerson>Smith</UGShipPerson>
                    <UGShipCity>Banglore</UGShipCity>
                    <UGShipState>KR</UGShipState>
                    <UGShipDate>4/11/1999</UGShipDate>
                </UserGift>
            </UserGifts>
            <CardDets>
                <CardDet>
                    <CDSrno>1251</CDSrno>
                    <CDCardId>4</CDCardId>
                    <CDStatus>S</CDStatus>
                </CardDet>
            </CardDets>
            <CardGifts>
                <CardGift>
                    <CGCDSrno>1251</CGCDSrno>
                    <CGUGSrno>333</CGUGSrno>
                    <CGUserId>930</CGUserId>
                    <CGTransId>1</CGTransId>
                </CardGift>
                <CardGift>
                    <CGCDSrno>1251</CGCDSrno>
                    <CGUGSrno>332</CGLTGSrno>
                    <CGUserId>930</CGUserId>
                    <CGTransId>1</CGTransId>
                </CardGift>
            </CardGifts>
            <CardDetDets>
                <CardDetDet>
                    <CDDSrno>1251</CDDSrno>
                    <CDDSrnol>1</CDDSrnol>
                    <CDDColor>-16777216</CDDColor>
                    <CDDPage>FI</CDDPage>
                    <CDDFont>Dialog</CDDFont>
                    <CDDSize>6</CDDSize>
                    <CDDText>HI PAL!</CDDText>
                    <CDDXPos>210</CDDXPos>
                    <CDDYPos>212</CDDYPos>
                    <CDDStyle>0</CDDStyle>
                </CardDetDet>
                <CardDetDet>
                    <CDDSrno>1251</CDDSrno>
                    <CDDSrnol>2</CDDSrnol>
                    <CDDColor>-16777216</CDDColor>
                    <CDDPage>F</CDDPage>
                    <CDDFont>Dialog</CDDFont>
                    <CDDSize>6</CDDSize>
                    <CDDText>HAPPY BIRTHDAY</CDDText>
                    <CDDXPos>235</CDDXPos>
                    <CDDYPos>200</CDDYPos>
                    <CDDStyle>0</CDDStyTe>
                </CardDetDet>
            </CardDetDets>
        </Transaction>
    </Transactions>
</Print>
```

Client System

Figure 8:
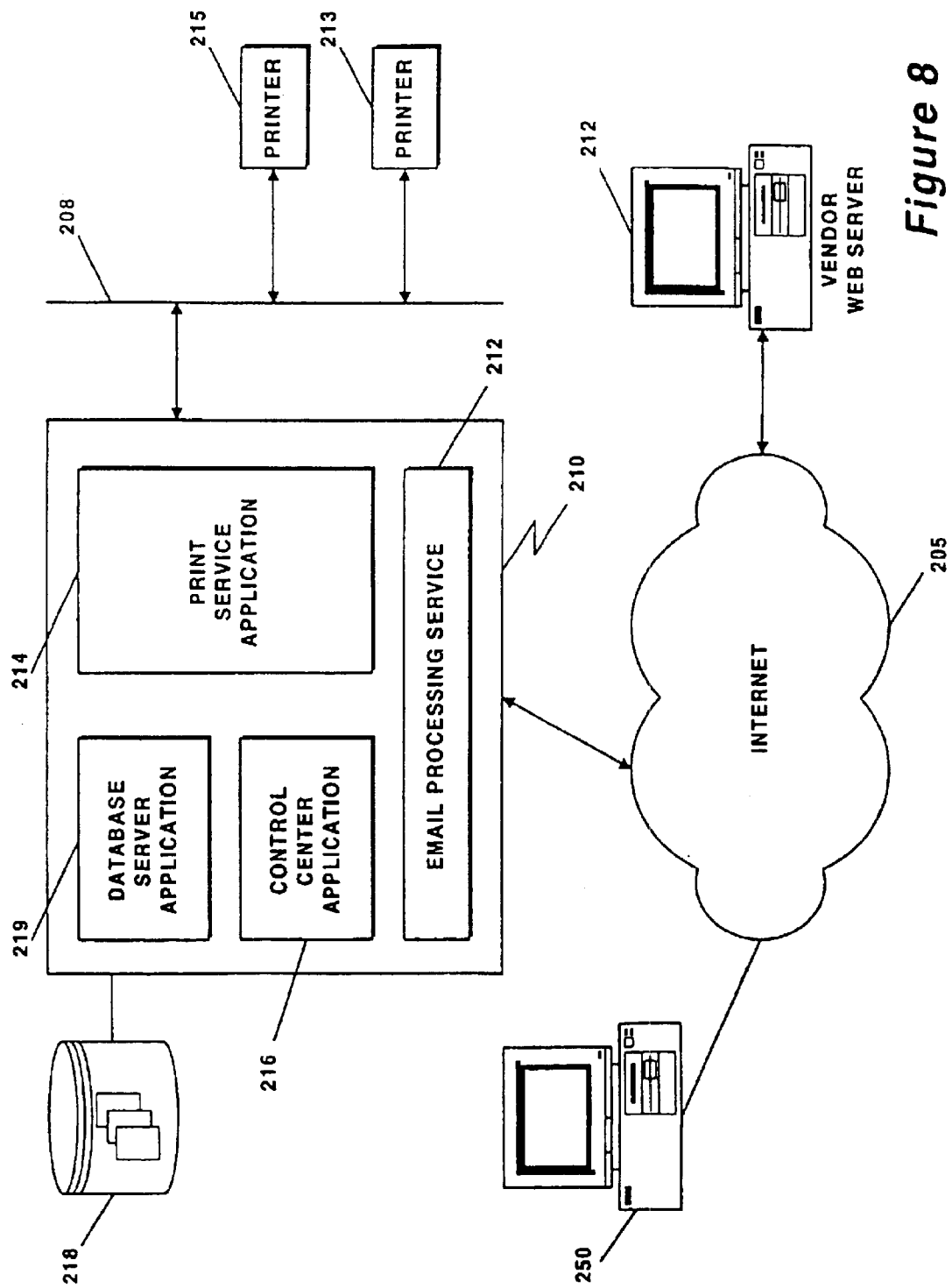
FIG. 8 is a conceptual block diagram illustrating the elements of the inventive vendor system in accordance with the present invention.

Referring to FIG. 8, a conceptual block diagram of a vendor (client) system 210 is illustrated. System 210 will typically be located at an eCommerce vendor's distribution center and may be connected through a public computer network to system 250. In addition, system 210 is coupled through a private network 208, such as a LAN, to printer 215 and printer 213. Vendor system 210 may be implemented with a computer hardware platform similar to that described with reference to FIG. 1 executing an operating system, such as Windows NT 4.0. As illustrated in FIG. 8, an email processing service application 212, print service application 214, database server application 219 and control center application 216 execute on computer system 210 under the control of the operating system. A database 218 coupled to system 210 contains tables 804–866, as described with reference to FIG. 10, as well as the collection of base cards as previously described. Alternatively, the cards, as stored in one of the previously-described formats. Alternatively, the cards may be encrypted and stored as binary blobs which are decrypted upon printing thereof.

Email processing service 212 is responsible for periodically polling email server 288 of system 250 to see if any messages have been posted. If there are messages, email processing service 212 will down load and process the messages. Processing of the messages includes parsing the XML file 1000 contained within the email message and using the data values defined therein to update database 218 of vendor system 210. The XML file 1000, in the illustrative embodiment, may contain SQL database queries which are used to update database 218 of client system 210.

Figure 10:
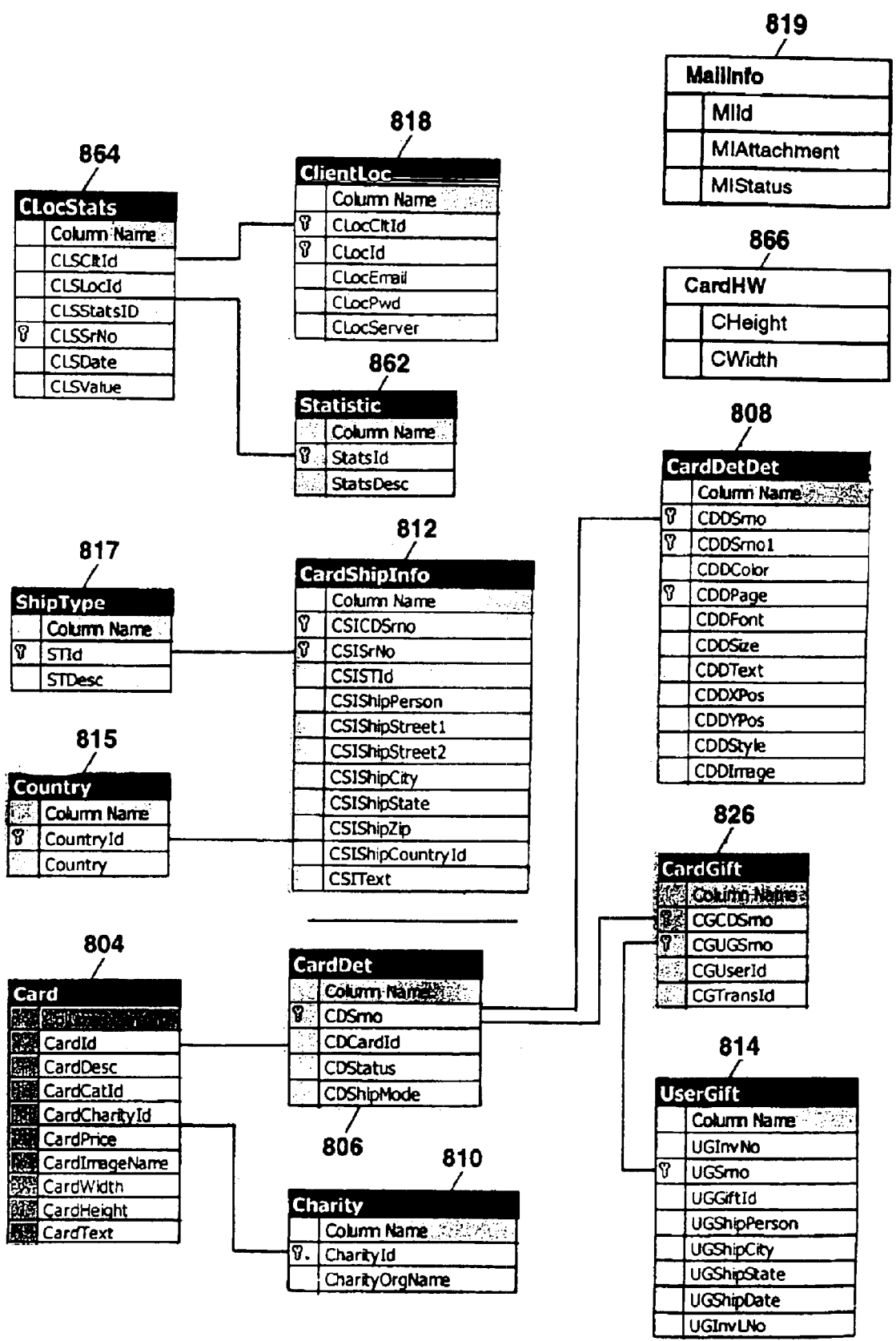
FIG. 10 illustrates conceptually the construction of the vendor database and the information contained therein.

FIG. 10 illustrates conceptually the tables which comprise database 218. Each record, as shown, includes one or more fields and an associated field descriptor, as illustrated. Multiple records of the same type, in turn, collectively form a table within database 218. A field within a record may serve as an index into another record. To further a better understanding of the architecture of database 218, the major tables, as illustrated conceptually by single record and its corresponding fields, are described below in greater detail.

Card Table 804 is used to maintain information about a specific card of the master card list. Each record of Card Table 804 includes fields for a card identifier, price, card catalog identifier, text description, width and height of the card, a charity identifier, etc. The corresponding field descriptions, e.g. integer, variable character, number, etc., are illustrated in FIG. 10. In the illustrative embodiment, the actual cards may be stored in any graphical format, for example, jpg, gif, tif or bmp. The cards may be stored as part of or separate from database 218, as well as locally in the memories of vendor systems 210 and distribution system 240 connectable to system 250.

Card Detail Table 806 (CardDet) is used to maintain information about a specific card which has been ordered by a network user. Each record of Card Detail Table 406 includes fields for the ship date, ship month, status, etc. The corresponding field descriptions are illustrated in FIG. 10.

The Card Detail Detail Table 808 (CardDetDet) is used to maintain information about changes or customizations made to the card by the network user. Each record of the Card Detail Detail Table 808 includes fields defining fields the font, size, color, text, X-position, Y-position, style, file name for an attached file containing graphics, digital photos, scanned data, etc. The corresponding field descriptions are illustrated in FIG. 10.

Charity Table 810 is used to maintain information relating to a specific charity from which proceeds of the card sale may be donated, as explained in greater detail hereinafter. Each record of Charity Table 810 includes fields for a charity identifier, and organizational name. The corresponding field descriptions are illustrated in FIG. 10.

The remaining tables of FIG. 10 include records having the information fields and field descriptors, as illustrated. For example, the Card Ship Info Table 412 includes information relevant to the address to which the card is to be shipped. The UserGift Table 814 includes information about a gift with which the card is associated. The CardGift Table 826 includes information useful in coordinating the printing of a card with shipment of a specified gift from a vendor's facilities. Tables 814–866 include the information fields and field descriptors, as illustrated in FIG. 10, some of which are subsets of similar tables from database 280. The records 804–866 of database 218 are related, as illustrated in FIG. 10 and which are self-explanatory. In particular, a specific entry of one table may be used as an index into a record of another table, as illustrated in the listing below in which each entry has the form:

| [Tablename.Fieldname] | REFERENCES [Tablename.Fieldname] |
|---|---|
| [Card.CardCharityId] | REFERENCES [Charity.CharityId] |
| [CLocStats.CLSCltId & CLSLocId] | REFERENCES [ClientLoc.CLocCltId & CLocId] |
| [CLocStats.CLSStatsID] | REFERENCES [Statistic.StatsId] |
| [CardDet.CDCardId] | REFERENCES [Card.CardId] |
| [CardDetDet.CDDSrno] | REFERENCES [CardDet.CDSrno] |
| [CardGift.CGCDSrno] | REFERENCES [CardDet.CDSrno] |
| [CardGift.CGUGSrno] | REFERENCES [UserGift.UGSrno] |

When a print message arrives, service 212 will update database 218 and set an event to notify the print service 214 that a print request has been received. Email processing service 212 is also responsible for sending any messages that are generated the other applications executing on vendor system 210. When not busy, email service 212 waits on a send event. Such event is set either by the vendor control center 216 or print service 214. If either application 214 or 216 has created an email for system 250, the application will set an event which service 212. Email processing service 212 will establish a connection with system 250 and transmit the email to system 250.

Print service 214 remains idle until an event notification of a pending print instruction. When email processing service 212 receives the print command it sets the notification event for print service 214. Print service 214 then queries database 218, and, using the data values previously stored in database 218 by email processing service 212, prints the card on printer 215 or another available printer. Print service 214 may also monitor printer problems such as paper jams, low toner, no paper, etc. Print service 214 will notify system 250 of any problem encountered during the printing process by creating an email, placing it in a queue and generating a notification event for email processing service 212 that an email needs to be sent to system 250.

A high resolution color printer 215 capable of printing photographic quality images may be coupled to vendor system 210 to facilitate printing of the cards. Such a printer suitable for use with the present invention is the HP 8500DN, commercially available from Hewlett Packard Corporation, Palo Alto, Calif. In the illustrative embodiment, cards are printed in a full bleed format, i.e. up to the edge of the paper and on high quality stock paper, giving the card the appearance of a traditional greeting card. Alternatively, the cards may have a border around the edge of the stock on which the card is printed. Thereafter, at the client/vendor's facilities, typically a distribution center, the card may be inventoried and matched with the designated gift for shipment.

At the vendor's facilities, the card is printed with and invoice number, invoice line item number and a card number thereon. In the illustractive embodiment, the invoice number, the invoice line item number, and card number may be printed on the back panel of the tangible card using, for example, an optical bar code or other format to identify both the card and the invoice number, client transaction code or other information useful by the vendor to match the card with a particular gift or transaction.

Vendor control center service 216 allows a user at the vendor's distribution location to request a reprint of a card, in case it has been damaged or for any reason. Service 216 also provides the users with the ability to quickly send an email to and interact with system 250 directly. Accordingly, service 216 allows the vendor location to request the re-transmission of data and files relating to certain cards in the event of data loss or corruption.

Although the above-described illustrative embodiment has been implemented using email addresses as a communication mechanism between system 250 and vendor system 210, it will be obvious to those reasonably skilled in the arts that other messaging techniques may be used, such as any number of commercially-available Remote Procedure Call library utilities, as well as the Microsoft Message Queue, (MSMQ) commercially available from Microsoft Corporation, Redmond, Wash.

Figure 11A:
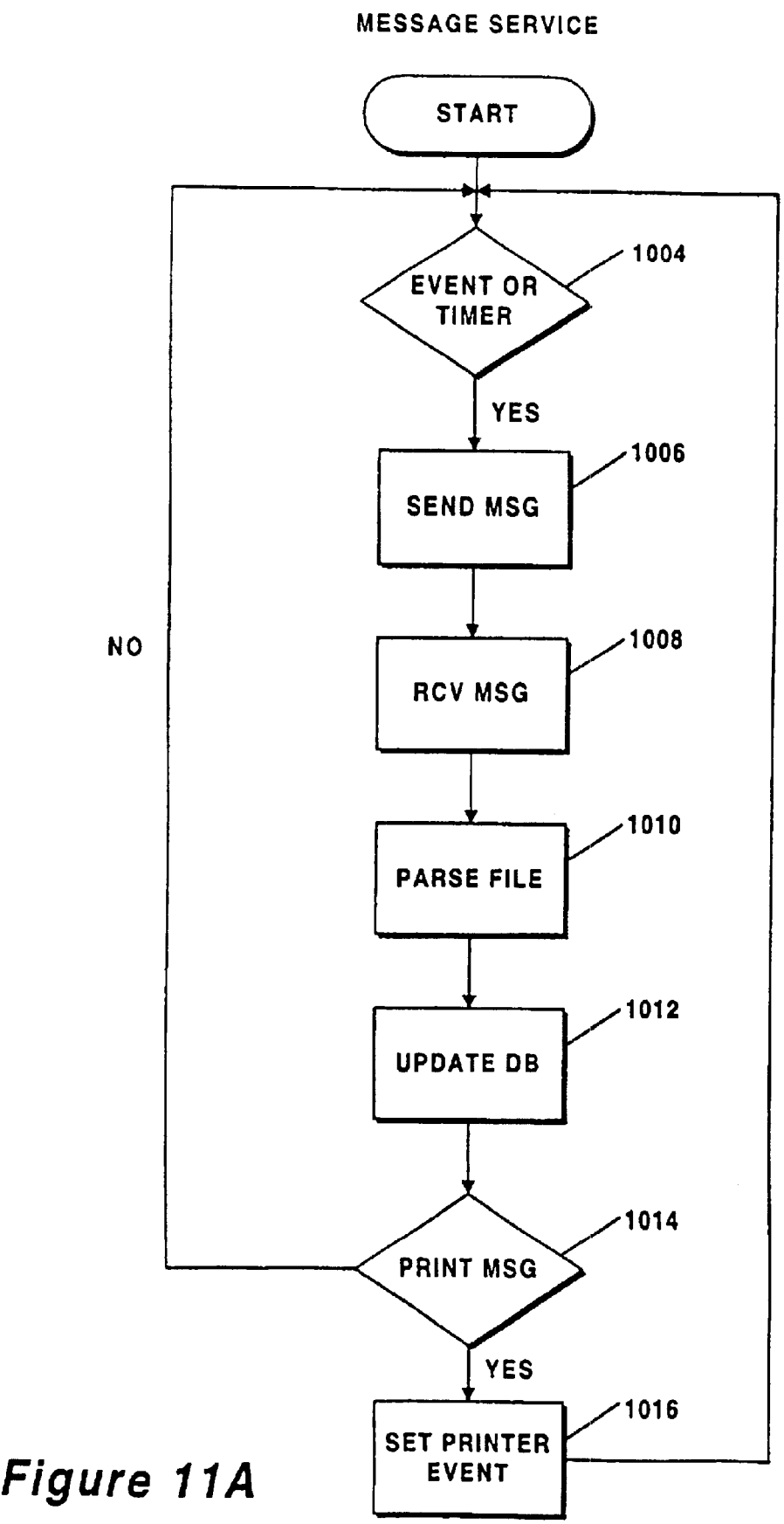
FIGS. 11A–C are flow charts illustrating the processes performed by a client system to print a card in accordance with the present invention.
Figure 11B:
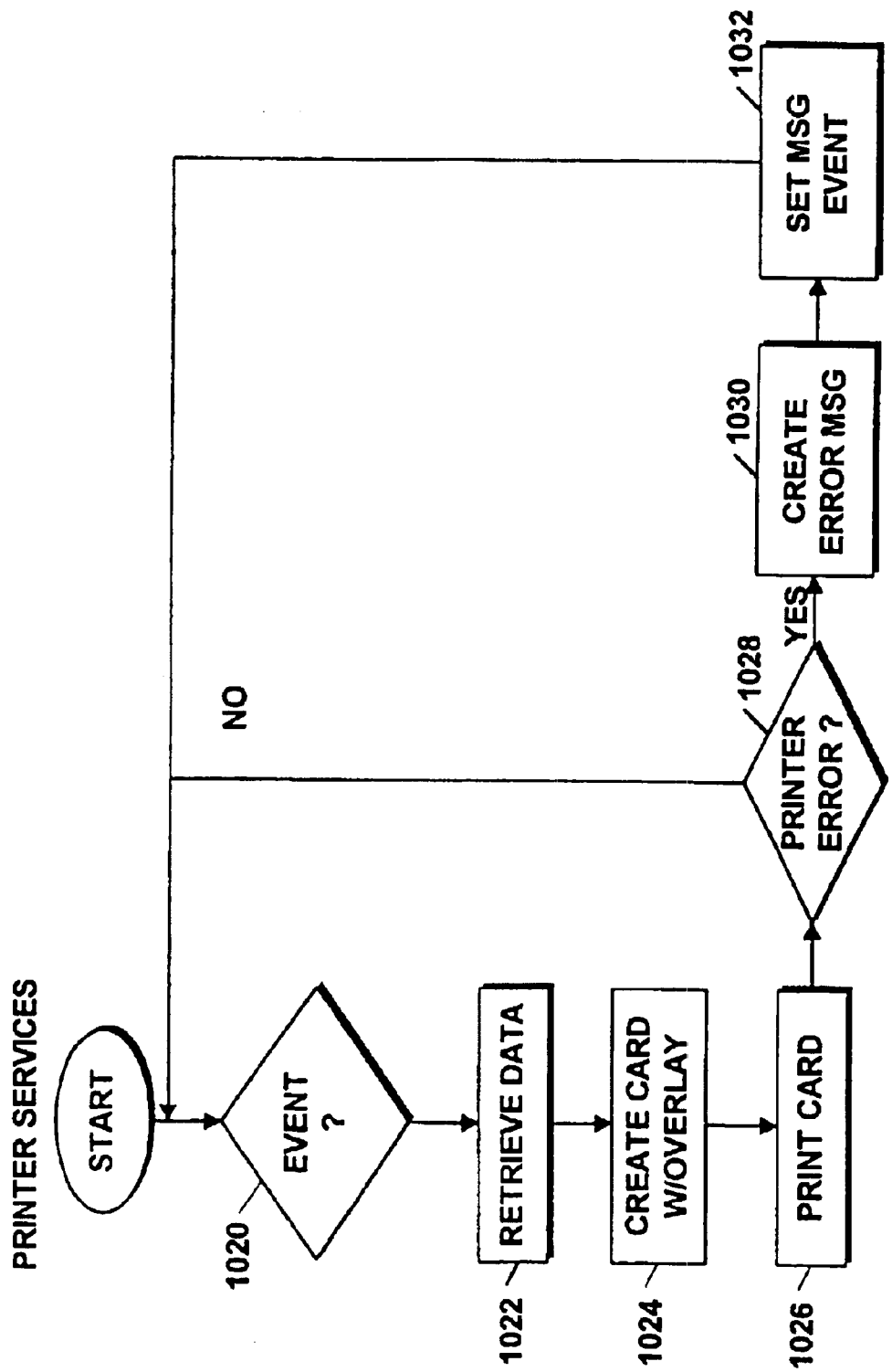
Figure 11C:
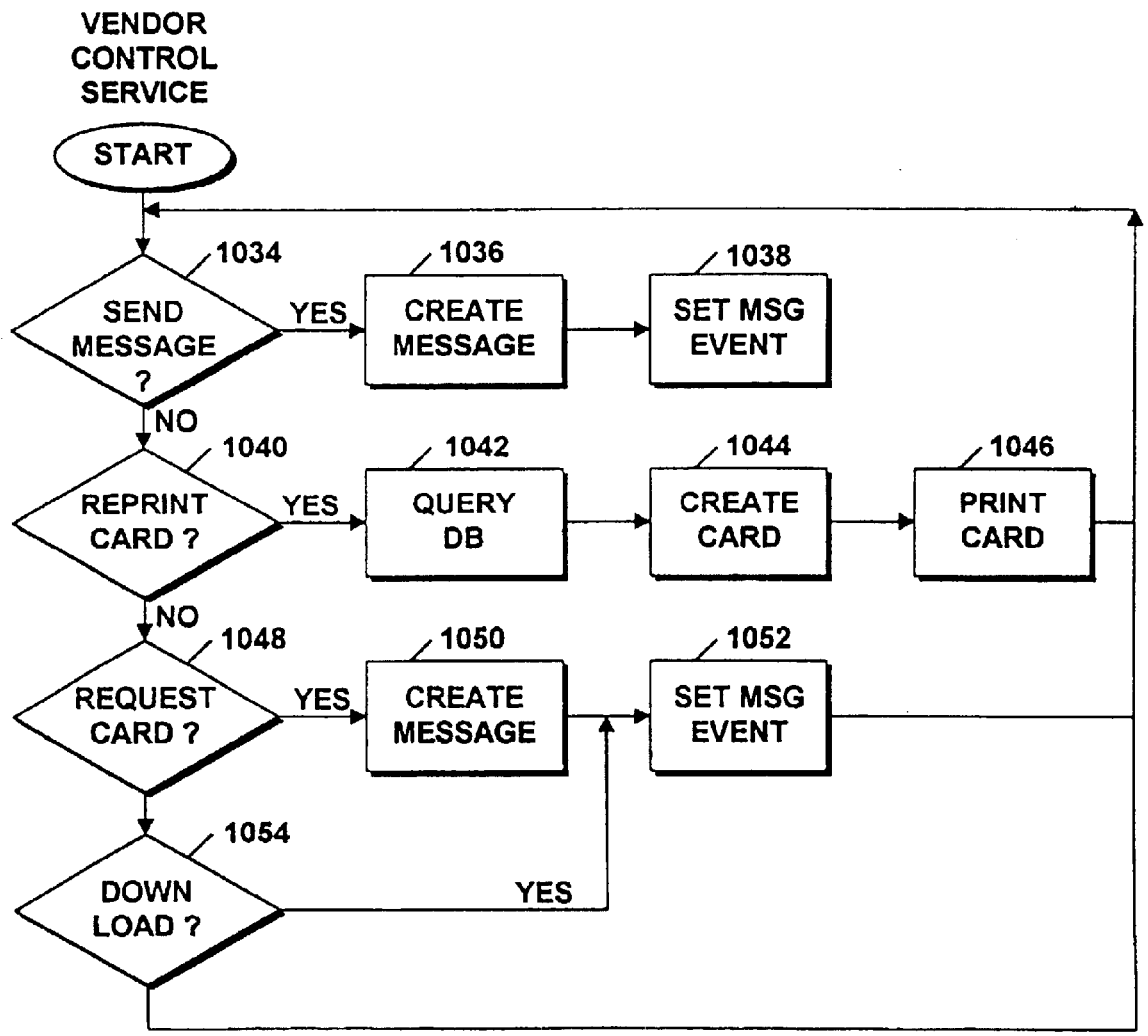

FIGS. 11A–C are flowcharts illustrating the processes performed by vendor system processes 212, 214 and 216 in accordance with the present invention. Specifically, referring to FIG. 11A, if a notification event for email processing service 212 has been received or generated by a timer, as illustrated by decisional step 1004, service 212 will send the email message to system 250, as illustrated by procedural step 1006. If a message has been received, the message will be downloaded to system 210, as illustrated by procedural step 1008. Email processing service 212 will parse the XML file attached with the email and extract the values for the data fields contained therein, as illustrated by procedural step 1010. Service 212 will store the values of the extracted data in database 218 of system 210, as illustrated by procedural step 1012. Thereafter, if an email message instructing the system 210 to print a card is received, service 212 will generate a notification event for print service 214, as illustrated by decisional step 1014 and procedural step 1016.

Referring to FIG. 11B, print service 214, upon receiving the notification event, will retrieve data from the appropriate records within database 218, as illustrated by decisional step 1020 and procedural step 1022, including retrieval of the base card image from database 218. Utilizing the data representing the customizations to the card, print service 214 will create the card image with the customizations, as illustrated by procedural step 1024, and print the card on a printer, as illustrated by procedural step 1026. If an error occurs during the printing process, as illustrated by decisional step 1028, print service 214 will generate an error message, as illustrated by procedural step 1030, and send an event notification to email processing service 212, as illustrated by procedural step 1032. Otherwise, the card will be printed, along with, optionally, a shipping receipt/invoice, to assist in matching the card with a corresponding gift or transaction.

Referring to FIG. 11C, the process of retransmitting data associated with one or more cards or communicating directly with system 250 is illustrated. If, through interaction of a user, typically a system administrator entering the appropriate user command, a request to send a message is received, vendor control center service 216 will create a message and send an event notification to email processing service 212, as illustrated by steps 1034–1038. Such messages are defined by the system administrator and may be requests for supplies of notifications of specific system need or conditions. If, through interaction of a user, a request to reprint a card is received, vendor control center service 216 will query database 218, create the card, and reprint the card, as illustrated by steps 1040–1046 and in a manner as previously described with reference to FIG. 11B. If, through interaction of a user, a request to send a particular card is received, versus waiting until the system automatically received the card data from system 250, vendor control center service 216 will create a message and send an event notification to email processing service 212, as illustrated by steps 1048–1052. If, through interaction of a user, a request to down load data immediately is received, vendor control center service 216 will send an event notification to email processing service 212, as illustrated by steps 1054 and 1052.

The above example describes a scenario in which a network user has hyperlinked to system 250 from the web site of an eCommerce vendor. Alternatively, if a network user connects directly to web server 260, to select and customize a card, the process occurs substantially as described above except that any necessary information contained in data 900 will be entered directly by the network user through the user interface web pages supplied by web server 260. In such a scenario, the billing, printing, inventorying and shipping of the card may be done directly by the inventive system 250 or using a system 240 which may be constructed and function similar to any other vendor system 210. Additionally, multiple systems similar to 240 may be located in disparate geographical regions and operatively coupled to system 250 over either public or private computer networks to enable accelerated delivery of the card without the cost of international postage.

The above-described invention may be implemented in either all software, all hardware, or a combination of hardware and software, including program code stored in firmware format to support dedicated hardware. A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system in a carrier wave, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results.

It will be apparent to those skilled in the art that modifications to the specific embodiments described herein may be made while still being within the spirit and scope of the present invention. For example, the method of providing the cost of shipping may be used for any delivery destination or origin location in the world including the case where both origin and delivery are located within the United States. Also the system of the present invention may provide the shopper with additional information that pertains to the shipment of a selected product. This information may include for instance, laws that prohibit the shipment of certain products into a particular country.

What is claimed is:

1. A method comprising:
   A. selecting a card from one of a plurality of cards accessible at a first web site:
   B. modifying the card;
   C. transmitting at least one of a card identifier and data modifying the card to a remote location over a computer network;
   D. authorizing printing of the card in combination with the modifications at a location where an item that has been ordered on line from one of a vendor web site and the first web site physically resides and with which the card is associated; and
   E. authorizing matching and shipment of the card with the item that has been ordered on line as a combined package, the card selected independent of the item ordered on line.

2. The method of claim 1 wherein (B) further comprises:
   (B1) viewing the modifications to the card in WYSIWYG format.

3. The method of claim 1 wherein the data modifying to the card comprises data representing one of a digital image and scanned information.

4. A computer system connectable to a computer network comprising:
   A. a processor;
   B. a memory coupled to the processor for storing a plurality of cards;
   C. a network interface coupled to the processor and the memory to allow network access to the plurality of cards;
   D. program logic configured to receive data identifying one of the plurality of cards and further defining modifications to the card;
   E. program logic configured to receive data associating the card with an item that has been ordered on line from a vendor web site, the identified card selected independent of the item ordered on line;
   F. program logic configured to transmit, over a computer network to a system located where the item ordered on line is located, one of the data identifying the card and modifications to the card, and the data associating the card with the item has been ordered on line; and
   G. program logic configured to print, at the location where the item ordered on line is located, the modified card to enable matching and shipment of the printed modified card with the item ordered on line as a combined package.

5. The apparatus of claim 4 further comprising:
   H. program logic configured to present an image of the card in combination with the received modifications to the card.

6. The apparatus of claim 5 wherein (H) comprises:
   (H1) program logic configured to present an image of the card in combination with the received modifications to the card in WYSIWYG format.

7. The apparatus of claim 4 wherein the data defining modifications to the card comprises data representing one of a digital image and scanned information.

8. The apparatus of claim 4 wherein the data associating the card with the item ordered on line is selected from selected from the group consisting of a card identifier, modification identifier, recipient identifier, item identifier, vendor transaction identifier, vendor identifier and vendor network address.

9. The apparatus of claim 4 wherein (G) comprises:
   (G1) program logic configured to print on a side of the card a reference to a data value selected from the group consisting of a card identifier, modification identifier, recipient identifier, item identifier, vendor transaction identifier, vendor identifier and vendor network address.

10. A method for associating customized greeting cards with items ordered on line comprising:
    (A) maintaining a network accessible compilation of cards;
    (B) receiving data identifying one of the cards;
    (C) receiving data defining modifications to the card;
    (D) printing the card in combination with the modifications at a remote location where an item, that has been ordered on line from a vendor web site, physically resides, the identified card selected independent of the item ordered on line;
    (E) matching the printed card with the item that has been ordered on line from a vendor web site and which is associated with a recipient; and
    (F) initiating shipment of the combination of the printed card and item that has been ordered on line from the vendor web site to the recipient.

11. The method of claim 10 wherein (D) further comprises:
    (D1) printing, on a panel of the card, a data reference comprising at least one of an item identifier and vendor transaction identifier thereon.

12. The method of claim 11 wherein (E) further comprises:
    (E1) using the data reference printed on the card to match the printed card with the item that has been ordered online from the vendor web site and which is associated with a recipient.

13. The method of claim 10 wherein (D) further comprises:

(D1) printing, on a panel of the card, a reference to a data value data selected from the group consisting of a card identifier, modification identifier, recipient identifier, item identifier, vendor transaction identifier, vendor identifier and vendor network address.

14. The method of claim 13 wherein (E) further comprises:

(E1) using the reference to the data value printed on the card to match the printed card with the item that has been ordered online from the vendor web site and which is associated with a recipient.

15. A method of virtual shopping for an on line item and a personalized greeting card comprising:

(A) accessing a vendor web site offering a plurality of items for on line ordering;

(B) ordering an item on line from the vendor web site;

(C) identifying a recipient;

(D) accessing a card web site from a link associated with the vendor web site;

(E) selecting at the card web site one of a plurality of greeting cards;

(F) defining personalized modifications to the selected greeting card;

(G) authorizing printing of the selected greeting card in conjunction with the personalized modifications at a location where the item, that has been ordered on line from the vendor web site, physically resides; and (H) authorizing shipment of the printed greeting card, selected from the card web site, with the item ordered online, from the vendor web site, as a combined package to the identified recipient, the identified greeting card selected independent of the item ordered on line.

16. The method of claim 15 wherein (E) comprises:

(E1) viewing the personalized modifications to the selected greeting card in WYSIWYG format.

17. The method of claim 15 wherein (G) comprises:

(G11) authorizing matching and combining of the printed personalized greeting card and the item ordered online.

18. A method comprising:

(A) offering a plurality of items for on line ordering from a network accessible first web site;

(B) receiving data identifying an item ordered on line from the first web site;

(C) receiving data identifying a recipient;

(D) providing a link to a network accessible compilation of greeting cards;

(E) receiving data identifying one of the plurality of greeting cards, the identified greeting card selected independent of the item ordered on line;

(F) receiving data defining personalized modifications to the identified greeting card;

(G) printing the identified greeting card in conjunction with the personalized modifications at a location where the item ordered on line physically resides;

(H) matching and combining the printed personalized greeting card and the item ordered online as a combined card and item parcel; and (I) shipping the printed personalized greeting card and the item ordered online as a combined card and item parcel to the identified recipient.

19. The method of claim 18 wherein the data defining personalized modifications to the identified greeting card comprises data representing one of a digital image and scanned information.

20. The method of claim 18 wherein (G) comprises:

(G1) printing, on a side of the personalized greeting card, a reference to a data value selected from the group consisting of a card identifier, modification identifier, recipient identifier, item identifier, vendor transaction identifier, vendor identifier and vendor network address.

21. The method of claim 20 wherein (H) comprises:

(H1) utilizing the reference on the personalized greeting card to locate the item ordered online.

22. A method comprising:

(A) offering a plurality of items for on line ordering from a first network accessible web site;

(B) receiving data identifying at least one item ordered on line from the vendor web site;

(C) receiving data identifying a recipient;

(D) offering a plurality of greeting cards for on line ordering in association with the first web site;

(E) receiving data identifying one of a plurality of greeting cards, the identified greeting card selected independent of the item ordered on line;

(F) receiving data defining personalized modifications to the identified greeting card;

(G) storing data associating the at least one item ordered on line with the identified greeting card and personalized modifications thereto;

(H) printing the identified greeting card in conjunction with the personalized modifications and a reference to the data associating the at least one item ordered on line with the greeting card;

(I) combining the printed personalized greeting card and the at least one item ordered online as a combined card and item package; and (J) shipping the combined card and item package to the identified recipient.

23. The method of claim 22 wherein the data associating the at least one item ordered on line with the identified greeting card is selected from the group consisting of a greeting card identifier, personalized modifications identifier, recipient identifier, item identifier, vendor transaction identifier, vendor identifier and vendor network address.

24. A method comprising:

(A) offering a plurality of items for on line ordering over a network accessible web site;

(B) receiving data identifying at least one item ordered on line from a vendor web site;

(C) receiving data identifying a recipient;

(D) offering a plurality of greeting cards for on line ordering in association with the vendor web site;

(E) receiving data identifying one of a plurality of greeting cards, the identified greeting card selected independent of the item ordered on line;

(F) receiving data defining personalized modifications to the identified greeting card;

(G) storing order data associating the at least one item ordered on line with the identified greeting card and personalized modifications thereto;

(H) transmitting the order data to a location where the at least one item ordered on line is physically located;

(I) printing the identified greeting card in conjunction with the personalized modifications and a reference to the data associating the at least one item ordered on line with the greeting card;

(J) combining the printed personalized greeting card and the at least one item ordered online as a package; and (K) shipping the combined card and item package to the identified recipient.

25. The method of claim 24 wherein the data associating the at least one item ordered on line with the identified greeting card is selected from the group consisting of a greeting card identifier, personalized modifications identifier, recipient identifier, item identifier, vendor transaction identifier, vendor identifier and vendor network address.

26. A computer program product for use with a computer system operatively coupled to a computer network comprises a computer usable medium having program code embodied thereon, the program code comprising:

A program code for storing a plurality of cards in a computer memory;

B. program code for allowing network access to the plurality of cards;

C. program code for receiving data identifying one of the plurality of cards and further defining modifications to the card;

D. program code for receiving data associating the card with an item that has been ordered on line from a vendor web site, the identified card selected independent of the item ordered on line;

E. program code for transmitting, over a computer network to a system located where the item ordered on line is located, one of the data identifying the card and modifications to the card, and the data associating the card with the item has been ordered on line; and F. program code for printing, at the location where the item ordered on line is located, the modified card to enable matching and shipment of the printed modified card with the item ordered on line as a combined package.

27. The computer program product of claim 26 further comprising:

G. program code for presenting an image of the card in combination with the received modifications to the card.

28. The computer program product of claim 27 wherein (G) comprises:

(G1) program logic code for presenting an image of the card in combination with the received modifications to the card in WYSIWYG format.

29. The computer program product of claim 26 wherein the data defining modifications to the card comprises data representing one of a digital image and scanned information.

30. The computer program product of claim 26 wherein the data associating the card with the item ordered on line is selected from the group consisting of a card identifier, modification identifier, recipient identifier, item identifier, vendor transaction identifier, vendor identifier and vendor network address.

31. The computer program product of claim 26 wherein (F) comprises:

(F1) program code for printing on a side of the card a reference to a data value selected from the group consisting of a card identifier, modification identifier, recipient identifier, item identifier, vendor transaction identifier, vendor identifier and vendor network address.

* * * * *